US006170548B1

(12) United States Patent
Swiszcz et al.

(10) Patent No.: US 6,170,548 B1
(45) Date of Patent: Jan. 9, 2001

(54) APPARATUS FOR FORMING A FABRIC AND COMPONENTS THEREOF FOR A COVERING FOR ARCHITECTURAL OPENINGS AND METHOD OF TREATING ENDS THEREOF

(75) Inventors: Paul G. Swiszcz; Wendell B. Colson, both of Boulder, CO (US)

(73) Assignee: Hunter Douglas, Inc., Upper Saddle River, NJ (US)

( * ) Notice: Under 35 U.S.C. 154(b), the term of this patent shall be extended for 0 days.

(21) Appl. No.: 09/031,211

(22) Filed: Feb. 26, 1998

Related U.S. Application Data

(60) Division of application No. 08/639,906, filed on Apr. 24, 1996, now Pat. No. 5,876,545, which is a continuation-in-part of application No. 08/437,960, filed on May 10, 1995, now Pat. No. 5,749,404.

(51) Int. Cl.$^{7}$ .................................................... B32B 31/10

(52) U.S. Cl. .......................... 156/461; 156/470; 156/519; 156/546; 156/552

(58) Field of Search .................................... 156/200, 204, 156/461, 519, 264, 242, 250, 201, 203, 546, 464, 438, 562, 465, 466, 470, 552; 283/36; 270/5.01

(56) References Cited

U.S. PATENT DOCUMENTS

| | | | |
|---|---|---|---|
| 176,005 * | 4/1876 | Jones | 283/36 |
| 1,468,433 | 9/1923 | Zackow . | |
| 2,123,010 | 7/1938 | Kahn . | |
| 2,169,873 | 8/1939 | Clark, Jr. . | |
| 2,326,454 | 8/1943 | Gentile . | |
| 3,280,891 | 10/1966 | Eldredge, Jr. et al. . | |

FOREIGN PATENT DOCUMENTS

| | | |
|---|---|---|
| 387133 | 5/1940 | (CA) . |
| 2090046 | 8/1994 | (CA) . |
| 837171 | 7/1949 | (DE) . |
| 2920323 | 11/1980 | (DE) . |
| 3048763 | 8/1982 | (DE) . |
| 3207850 | 9/1983 | (DE) . |
| 3312988 | 10/1984 | (DE) . |
| 90014294 | 5/1990 | (DE) . |
| 111926 | 6/1984 | (EP) . |
| 288937 | 7/1987 | (EP) . |
| 427477 | 5/1991 | (EP) . |
| 469695 | 2/1992 | (EP) . |
| 589846 | 3/1994 | (EP) . |
| 1069055 | 7/1954 | (FR) . |
| 2362264 | 3/1978 | (FR) . |
| 349290 | 5/1931 | (GB) . |
| 632832 | 5/1949 | (GB) . |
| 2275074 | 8/1994 | (GB) . |
| 5019313 | 5/1990 | (JP) . |
| 8704057 | 7/1987 | (WO) . |
| 8912415 | 12/1989 | (WO) . |

* cited by examiner (List continued on next page.)

*Primary Examiner*—Michael W. Ball
*Assistant Examiner*—Gladys Piazza
(74) *Attorney, Agent, or Firm*—Dorsey & Whitney LLP

(57) ABSTRACT

A fabric for use in an architectural covering device includes a plurality of elongated vanes preferably of tubular configuration having a pair of flaps extending longitudinally along the entire length of the vane. A continuous face sheet material has elongated folds at spaced intervals that are secured along the flaps of the vanes so as to pivotally connect the vanes to the face sheet material at predetermined spaced intervals. The fabric is adapted to be supported with an operational system in an architectural opening so that if the vanes are suspended vertically they are slidably movable laterally of the window opening and pivotally movable about vertical longitudinal axes to extend and retract as well as open and close the covering. An apparatus and method for forming the fabric is also disclosed as well as systems for finishing the endmost vanes in the fabric.

22 Claims, 23 Drawing Sheets

U.S. PATENT DOCUMENTS

| | | | |
|---|---|---|---|
| 3,843,483 | * 10/1974 | Sendor et al. | 156/461 |
| 3,844,330 | 10/1974 | Hyman . | |
| 3,851,699 | 12/1974 | Shapiro . | |
| 3,946,789 | 3/1976 | Ronkholz-Tolle . | |
| 4,108,702 | 8/1978 | Welch et al. | 156/192 |
| 4,122,884 | 10/1978 | Salzmann . | |
| 4,352,384 | 10/1982 | McCoy, Jr. . | |
| 4,434,834 | 3/1984 | Ennes . | |
| 4,519,435 | 5/1985 | Stier . | |
| 4,535,828 | 8/1985 | Brockhaus . | |
| 4,628,981 | 12/1986 | Ciriaci et al. . | |
| 4,779,661 | 10/1988 | Yalowega . | |
| 4,792,427 | 12/1988 | Reeves . | |
| 4,846,243 | 7/1989 | Schneider . | |
| 4,911,220 | 3/1990 | Hiller . | |
| 4,930,562 | 6/1990 | Goodman . | |
| 5,004,033 | 4/1991 | Stipkovits . | |
| 5,012,552 | 5/1991 | Wulf . | |
| 5,029,365 | 7/1991 | McCabe . | |
| 5,101,876 | 4/1992 | Zak . | |
| 5,109,913 | 5/1992 | Kazuma . | |
| 5,141,042 | 8/1992 | Schwaegerle . | |
| 5,203,394 | 4/1993 | Hailey . | |
| 5,271,447 | 12/1993 | Aronovich . | |
| 5,297,607 | 3/1994 | Beachamp . | |
| 5,358,024 | 10/1994 | Schwaegerle . | |

APPARATUS FOR FORMING A FABRIC AND COMPONENTS THEREOF FOR A COVERING FOR ARCHITECTURAL OPENINGS AND METHOD OF TREATING ENDS THEREOF

CROSS REFERENCE TO RELATED APPLICATIONS

This application is a division of application Ser. No. 08/639,906 filed Apr. 24, 1996, now U.S. Pat. No. 5,876,545, which application is a continuation-in-part of Ser. No. 08/437,960, filed May 10, 1995, now U.S. Pat. No. 5,749,404.

BACKGROUND OF THE INVENTION

1. Field of the Invention

The present invention relates generally to fabric for use in covering an architectural opening such as a door, window or for otherwise furnishing the interior of dwellings and more particularly to a fabric, as well as the method and apparatus for manufacturing same, including a plurality of vanes interconnected by a sheet or sheets of face material. When the vanes are oriented vertically, the fabric can be suspended in the architectural opening with a hardware system adapted to slide the vanes laterally of the opening between extended and retracted positions and pivot the vanes about vertical axes between open and closed positions.

2. Description of the Known Art

Coverings for architectural openings such as doors, windows and the like are very common and serve a triple purpose in decorating, providing privacy and insulating an architectural structure. Such coverings have taken numerous forms with early architectural coverings consisting primarily of fabric adjustably positioned over an architectural opening in different manners. For many years, the fabric has been suspended adjacent to the top of the architectural opening by hardware that allowed the fabric to be extended across the opening or retracted adjacent one or two sides of the opening. Folds or pleats have been provided to give the fabric a soft appearance. Such window coverings are commonly referred to as draperies. Fabrics for draperies come in numerous designs and weights so that many aesthetic appearances can be obtained along with varying degrees of insulation. Further, some fabrics are translucent in nature, such as sheers, thereby permitting to some degree the passage of light and vision.

Coverings for architectural openings also include Venetian blinds which consist of parallel horizontal slats of material suspended by tape ladders such that the slats are pivotal about horizontal axes and movable between an open position lying perpendicular to the architectural opening wherein light can be transferred through the opening and a closed position wherein the slats lie parallel to the opening and block the passage of light and vision through the opening. The blinds can also be retracted by lifting the slats so that they are gathered in stacked relationship adjacent to the top of the architectural opening. Venetian binds have added a new dimension to the decorative characteristic of window coverings by providing sharp clean lines which are desirable in certain environments.

Vertical blinds have also been developed which typically include a plurality of vertically suspended vanes that are pivotal about a vertical axis so as to be movable between an open position extending perpendicular to the window opening and a closed position extending parallel to the opening. It has been difficult to design vanes for vertical blinds so that they hang in a straight or untwisted manner from their top to bottom and will not twist from top to bottom when they are rotated about their vertical axis. Vanes made from wood, aluminum or polyvinylchloride have very little if any twist from top to bottom but are hard to the touch and cold visually, therefore rendering them undesirable for many applications. Vertical vanes have been formed from laminated materials, or hybrids of fabric with relatively rigid materials such as polyvinylchloride to soften the touch and the look but each of these vane constructions suffer from various shortcomings.

As will be appreciated, most draperies need to be retracted before permitting the passage of light and vision but are desirable in that they create a soft appearance with many varied aesthetic possibilities. Venetian or vertical blinds are desirable in that they selectively allow the passage of vision and light even when extended across a window opening but are typically more harsh in appearance than draperies. Attempts have accordingly been made at designing coverings for architectural openings which combine the positive features of draperies with the positive features of vertical and venetian blinds to arrive upon an enhanced covering product.

A patent disclosing the incorporation of a drapery look into a vertical blind type window covering is U.S. Pat. No. 3,851,699 issued to Shapiro on Dec. 3, 1974. In the window drape disclosed in the Shapiro patent, a continuous sheet of face fabric is secured to a plurality of vertically extending planar vanes in face-to-face relationship with the planar vanes so as to form a portion of the vane. The sheet of fabric therefore projects alternately off a front edge and rear edge of adjacent vanes.

Another window covering wherein a continuous sheet of face fabric is adhered to a plurality of vertical vanes is disclosed in the U.S. patent to Hyman U.S. Pat. No. 3,844,330 issued on Oct. 29, 1974. The Hyman product is different from Shapiro in that the face fabric is preferably bonded to the vertical vanes only along a top portion of the vane. It is difficult to control the appearance of a window covering constructed in this manner, however, as the face fabric is only connected at a top edge and therefore is free to move independently of the vanes along the majority of the length of the vanes. While Hyman suggests that the face fabric can be connected to the vanes along the entire length of the vanes, it is stated that such would detract from the drapery like appearance of the covering.

The patents to Ronkholz-Tolle, NeeTolle U.S. Pat. No. 3,946,789 issued Mar. 30, 1976, Wulf U.S. Pat. No. 5,012,552 issued May 7, 1991 and Kazuma U.S. Pat. No. 5,109,913 issued May 5, 1992 show other forms of architectural opening covers wherein a face sheet is interconnected to more rigid vertically extending vanes in various manners. In the case of the Ronkholz-Tolle and the Wulf patents, a continuous sheet of face fabric is interwoven around the more rigid vanes while in the Kazuma patent, individual strips of face fabric interconnect more rigid vanes creating a look that might be more similar to conventional vertical blinds than draperies.

The fabric of the present invention, along with its method and apparatus of manufacture, has been developed to overcome shortcomings in prior architectural opening coverings.

SUMMARY OF THE INVENTION

The fabric of the present invention which finds a use in a covering for an architectural opening includes a plurality of elongated vanes made from a first sheet or piece of material with the vanes being interconnected along one side edge to a continuous face sheet or piece of material so that the fabric so formed has the soft features of drapery and the positive light and vision blockout features of a vertical or venetian blind.

The vanes are preferably fabricated in a tubular configuration giving the vanes torsional rigidity along their length and through the use of fabric materials having diagonal dimensional stability or memory, allow the vanes to resist torque or twisting along their length while presenting a soft appearance. The vanes, however, preferably include a pair of flaps extending along a side edge thereof so that the face sheet material can be connected to the flaps such as by inserting the face sheet between the flaps and securing the face sheet therebetween to provide a positive connection between the vanes and the face sheet. In this manner, the fabric not only includes a unique combination of vanes and face sheet material, but the materials for the face sheet and the vanes can have different aesthetic, structural, functional and tactile characteristics.

The flaps on the vanes extend the full length of the vanes with the face sheet being secured to the vanes substantially along the entire length of the vanes. Due to the fact that the vanes preferably have torsional rigidity along their length, the behavior of the face sheet between the vanes is uniform and related to the vanes along the entire length of the covering giving a predictable appearance to the covering regardless of the position of the vanes.

When the vanes are oriented vertically, the face sheet may have an opaque valance strip secured along the top edge to hide the connections between the fabric and an operational system utilized-to support the fabric and move the vanes between open and closed, as well as extended and retracted positions. The preferred hollow characteristic of the tubular vanes provides an ideal arrangement for suspending the vanes from the operating system since the connectors between the fabric and the operating system can be positioned for the main part internally of the vane in a visually nonapparent location.

Each end of the covering is uniquely finished to complete the drapery-like appearance of the covering. The endmost vanes are covered with the face sheet material in a unique manner so that the fabric has a uniform textural appearance, hangs uniformly and is not detrimentally affected by solar heat.

An apparatus for fabricating a fabric in accordance with the present invention includes a supply roll of a first sheet of material used to fabricate the vanes. A straightener for removing any bow or curve from the first sheet material is provided downstream from the supply roll along with an adhesive applicator adapted to apply a bead of adhesive adjacent to opposite side edges of the first sheet material. A creasing system adapted to place creases adjacent to opposite side edges of the first sheet material and also possibly along an approximate center line of the first sheet material is also provided. A folder downstream from the creasing system simultaneously folds the sides of the first sheet material so that the side edges are proximate each other. A second adhesive applicator adapted to place a bead of adhesive on at least one of the folded side edges of the first sheet material receives the folded material and a compressor presses the side edges against each other to bond the sheet of material to itself along the bead of adhesive. A cutter is provided for cutting the folded and bonded first sheet material into predetermined lengths defining the vanes used in the fabric. A second supply roll of a face sheet material is provided adjacent to completed vanes along with a system for moving the face sheet material off the second supply roll in a direction perpendicular to the vanes. An inserter in the form of a blade adapted to insert a portion of the second sheet material between a pair of flaps defined on the vanes overlies the vanes and a second compressor seals the second sheet material between the flaps on the vanes. The fabric material formed by the apparatus is finally wound on an accumulator roll for shipment.

A method of forming the fabric comprises the steps performed by the aforenoted apparatus.

Other aspects, features and details of the present invention will be more completely understood by reference to the following detailed description of a preferred embodiment, taken in conjunction with the drawings, and from the appended claims.

DESCRIPTION OF THE PREFERRED EMBODIMENTS

Figure 1:
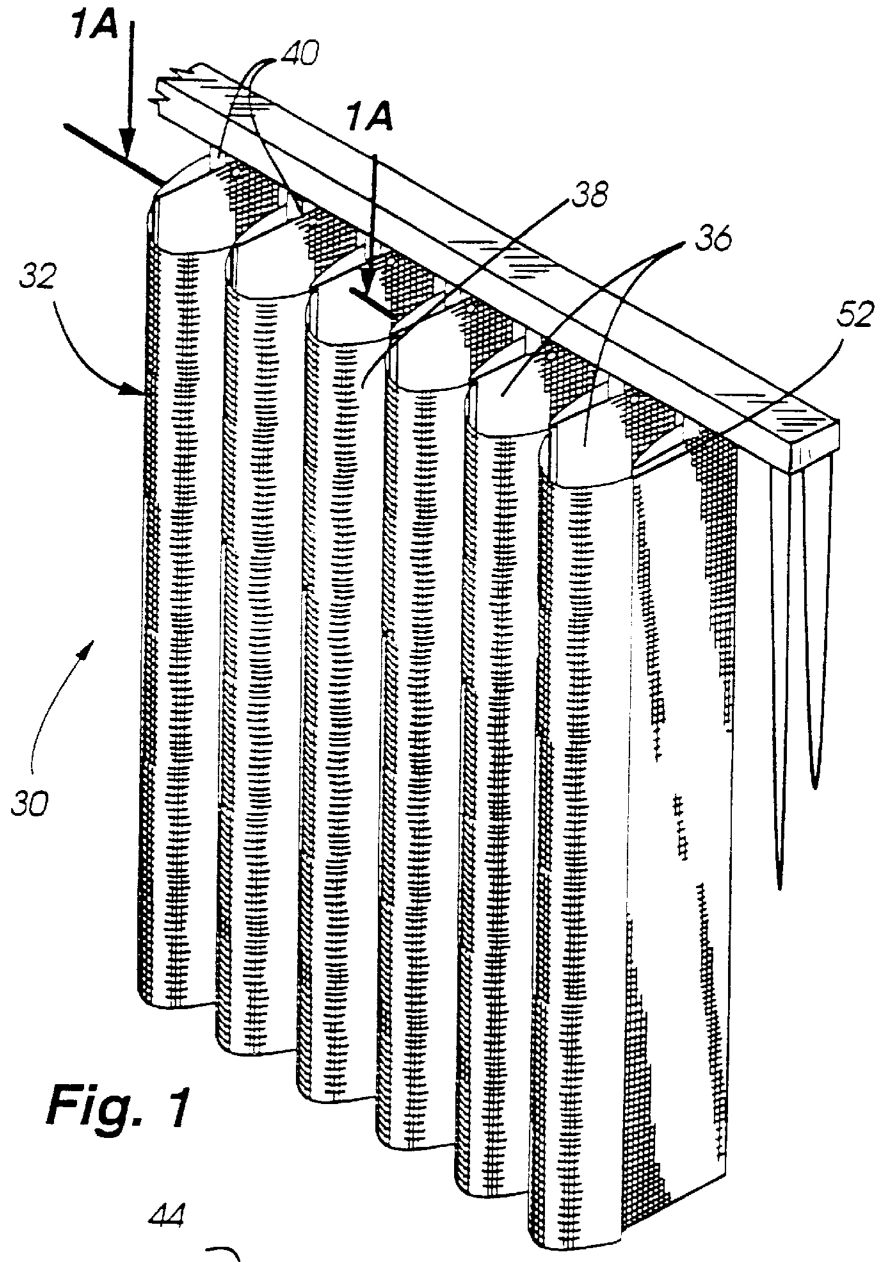
FIG. 1 is a fragmentary isometric view of the fabric of the present invention being suspended with a hardware system.

Referring first to FIG. 1, a covering 30 for an architectural opening (not shown) incorporating the fabric 32 of the present invention is illustrated. For purposes of the present disclosure, the covering 30 will be referred to as a window blind, it being recognized that the covering could be used in other architectural applications such as on doors, archways, skylights and the like. Further, while the description that follows assumes a vertical orientation of vanes 36 used in the fabric 32, it will be appreciated that the vanes could be oriented horizontally, thus requiring the use of a different operating system when the fabric is incorporated into an architectural covering device.

The window blind 30 broadly includes a headrail 34 suspendable from a wall or ceiling adjacent to a window opening and an operating system (not seen) connected to the headrail and adapted to suspend a plurality of vertically extending vanes 36 which are interconnected in parallel vertical relationship by a face sheet 38 of material.

Figure 3:
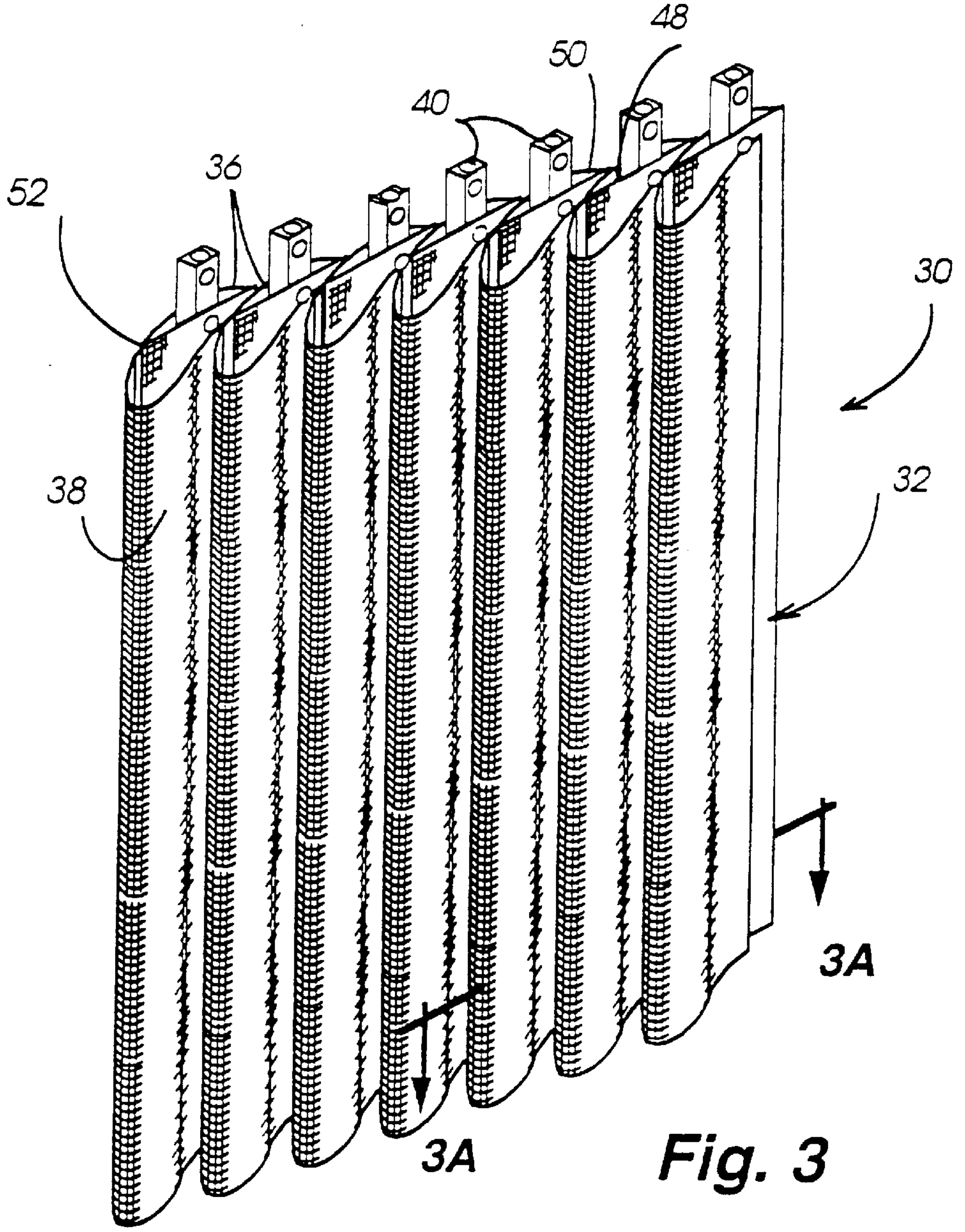
FIG. 3 is a fragmentary isometric view similar to FIG. 1 showing the fabric in an extended condition and the vanes in a closed position.
Figure 5:
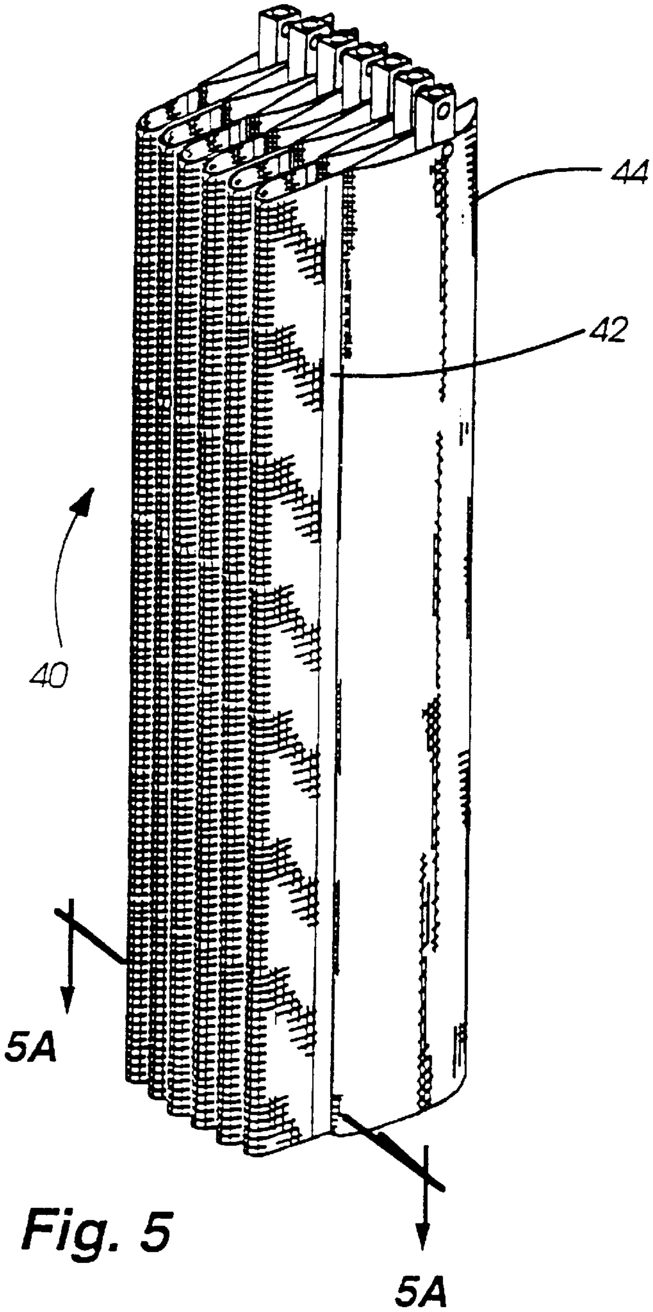
FIG. 5 is an isometric view of the fabric of the present invention with the fabric in a retracted condition and the vanes in an open position.

The operating system (not shown) includes hardware for interconnecting the operating system to the vanes through hanger plates 40 and for moving the window blind between extended and retracted positions shown in FIGS. 1 and 5 respectively, as well as open and closed positions as illustrated in FIGS. 1 and 3 respectively. In the extended position shown in FIG. 1, the vanes 36 are uniformly distributed across the window opening, while in the retracted position shown in FIG. 5, the vanes are horizontally stacked adjacent to a side of the window opening, it being understood that the vanes could be stacked adjacent to either or both sides of the window opening. When in at least a partially extended position, the vanes are pivotally movable between the open and closed positions. In the open position shown in FIG. 1, the vanes extend perpendicularly to the window opening and thus the plane of the face sheet 38, while in the closed position they preferably partially overlap in shingle-like relation (FIGS. 3A and 6) and extend in substantially parallel relationship to the window opening and thus the plane of the face sheet 38 and in coplanar relationship with each other.

While the vanes 36 could take numerous forms, it is preferable that they be of tubular configuration including longitudinally extending flaps 42 (FIGS. 1A and 3A) along one side edge of the vane to facilitate attachment of the vane to the face sheet 38 in a manner to be described hereinafter.

Figure 1A:
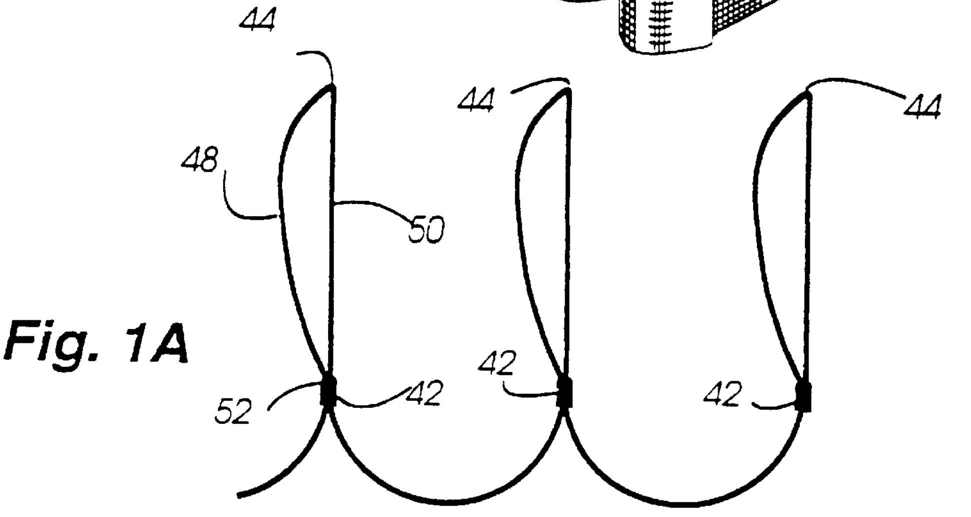
FIG. 1A is a section taken along line 1A—1A of FIG. 19.
Figure 2:
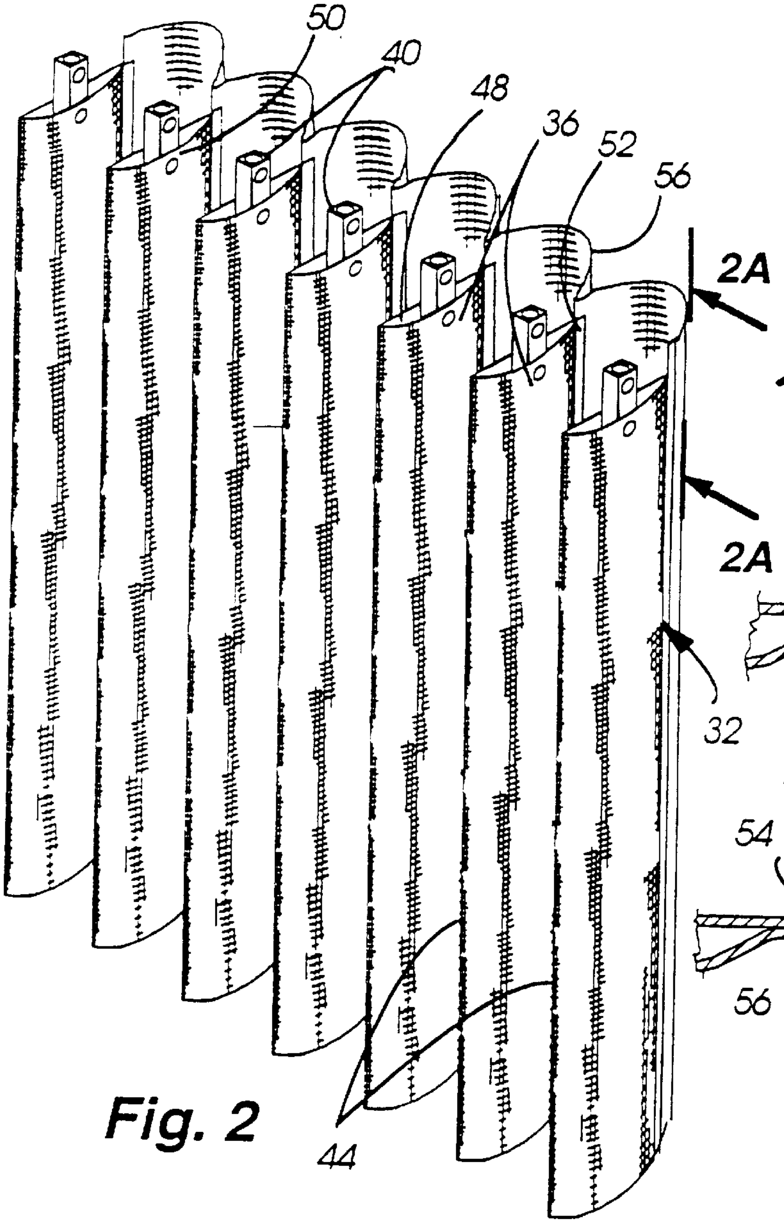
FIG. 2 is a fragmentary isometric view of the fabric of the present invention taken from the reverse side of that shown in FIG. 1 with the fabric extended and the vanes at an open position and with an optional valence along the top edge of the fabric.
Figure 2C:
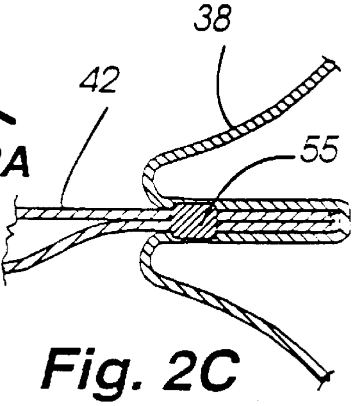
FIG. 2C is a fragmentary section similar to FIG. 2B illustrating an alternative arrangement for connecting the face sheet of the fabric to the vanes.
Figure 2B:
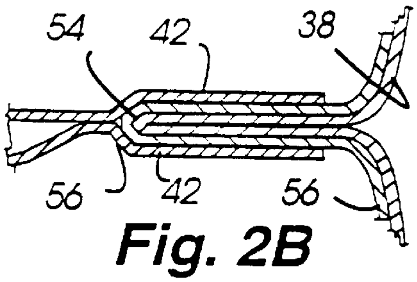
FIG. 2B is a further enlarged fragmentary section taken along line 2B—2B of FIG. 2A.
Figure 2A:
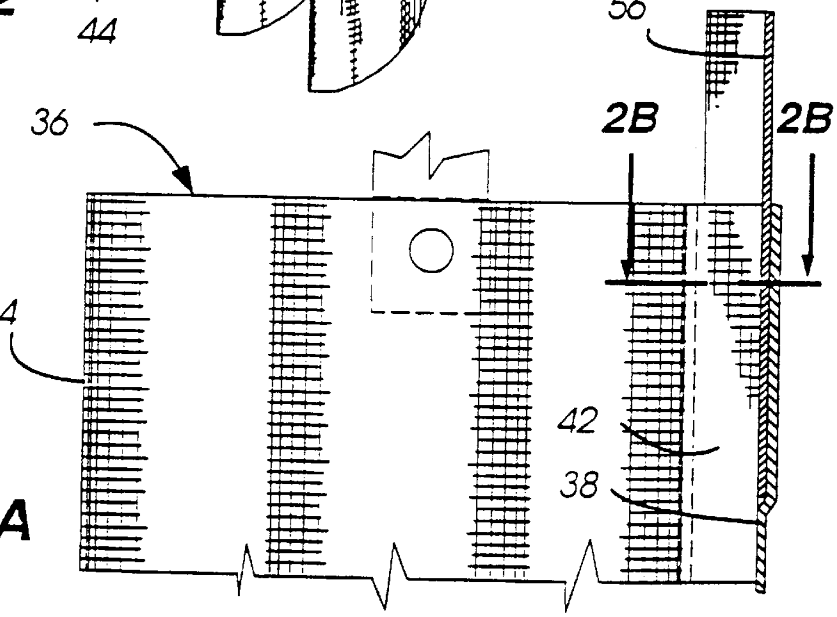
FIG. 2A is an enlarged fragmentary section taken along line 2A—2A of FIG. 2.

In one form of the vane 36 as possibly best seen in FIGS. 1A and 2A, the vane is formed from a single sheet of flexible material, preferably fabric, formed into an elongated tube of substantially air foil configuration. It should be appreciated, however, that the vane could take other general configurations, including each of those disclosed in copending U.S. application Ser. No. 08/639,889 (Apr. 24, 1996), now U.S. Pat. No. 5,797,442 (Aug. 25, 1998), entitled "Vane for an Architectural Covering and Method of Making Same," which is hereby incorporated by reference and is assigned to the same assignee as the present application. The elongated single sheet of material from which the vane is fabricated is folded upon itself along a line 44 that runs substantially along a central region of the sheet defining a front section of the vane along the central region. The fold may be creased as at 45 (FIGS. 12 and 13) or uncreased. After folding, the side edges 46 of the strip are disposed proximate each other and a relatively flat short side wall 48 and an outwardly convex long side wall 50 are defined (FIGS. 15 through 24). The long and short walls are secured together along a line of attachment 52 extending the entire length of the vane and at a location spaced slightly inwardly from the side edges 46 of the sheet material. A flap or edge portion 42 is thus defined adjacent each side edge of the sheet material, a flap being associated with the short and the long wall. The flap on each wall is rectangular in configuration having two long sides extending the length of the vane and two perpendicular short sides, one at the top of the vane and one at the bottom. The rectangular flaps when laid flat are preferably in the range of ¼ inch to ½ inch in width when the vane is formed from strip material approximately seven inches in width. In other words, each flap is preferably about 5% of the overall width of the strip from which the vane is formed.

Figure 25A:
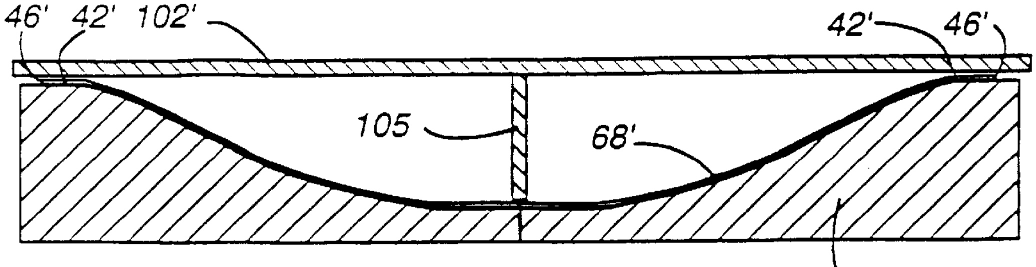
FIG. 25A is a section taken near the upstream end of a folder or former used to make an alternative vane for use in the fabric of the present invention.
Figure 25B:
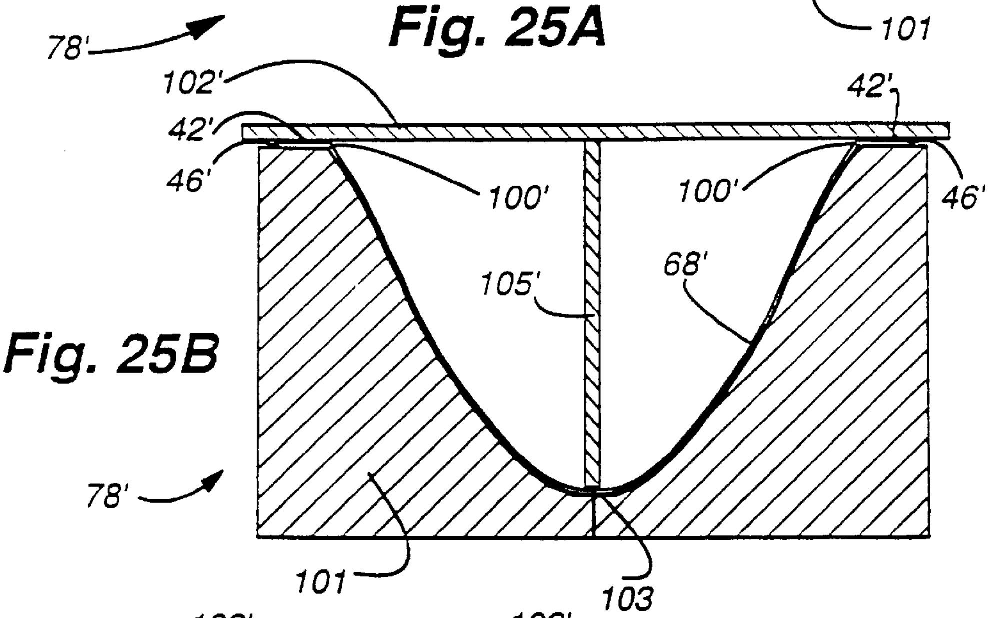
FIG. 25B is a section similar to FIG. 25A at a location further downstream.
Figure 25C:
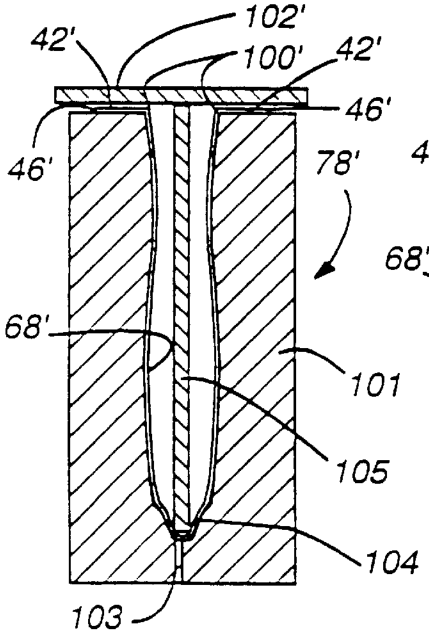
FIG. 25C is a section similar to FIG. 25A at a location near the downstream end of the folder or former.
Figure 25D:
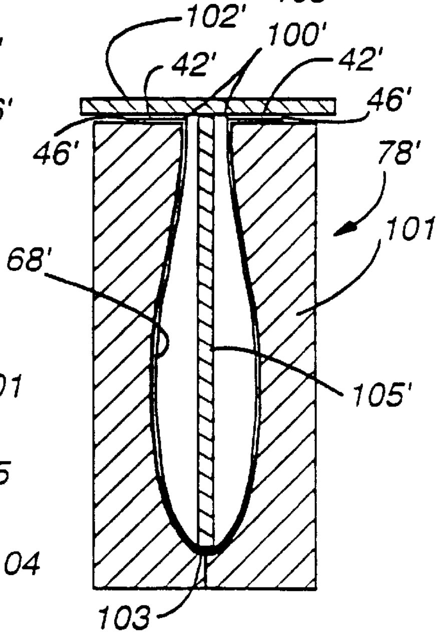
FIG. 25D is a section similar to FIG. 25A at the downstream end of the folder or former.
Figure 25E:
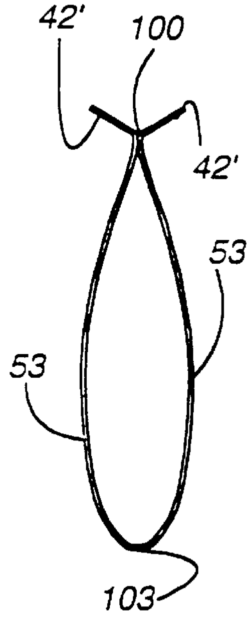
FIG. 25E is a section through the alternative vane shown being formed in FIGS. 25A through 25D.

In an alternative form of the vane 36' shown in FIG. 25E, the vane is formed from a single sheet of flexible material, as with the vane 36, but the sides 53 of the vane are of equal length and both are outwardly convex. A pair of flaps 42' are defined along one side edge of the vane to facilitate attachment of the vane 36' to the face sheet 38 in a manner to be described later in connection with the vane 36.

The vane 36 preferably has torsional rigidity along its length which results not only from the tubular construction of the vane but also through use of a fabric having diagonal, dimensional stability. Diagonal, dimensional stability is a characteristic of fabric that prevents the fabric from stretching or shrinking along a line diagonal to either the machine direction of the fabric or the cross direction of the fabric. The diagonal, dimensional stability in the fabric from which the vane is fabricated is a factor in the vane's ability to resist relative twisting along its length from top to bottom when the vane is rotated from the top. The diagonally, dimensionally stable characteristic of the material facilitates the transfer of torque along the length of the tubular vane so that when rotated from the top, the bottom will follow. Preferably, for the fabric to have diagonal, dimensional stability, it should be stretchable no more than 10% along a forty-five degree diagonal to the machine direction of the fabric when a force of eight ounces is applied between two points along the diagonal. A more detailed description of the fabric from which the vane is fabricated and the importance of the tubular construction of the vane can be found in the aforenoted U.S. Pat. No. 5,797,442.

While the material from which the vanes 36 are made can have varying characteristics, it is desirable that the vanes be made of an opaque or substantially opaque material so that when in the closed position the blind will substantially block light and vision. While the material from which the vanes are fabricated could have decorative designs imprinted thereon or formed therein, they might also be made of a plain and single color material.

The face sheet 38 (FIGS. 1–6) which interconnects the vanes is also made from a flexible fabric material and is secured to the vanes along-parallel vertically spaced lines of attachment at a rear section of the vanes by inserting folds 54 (FIGS. 2A and 21) of the face sheet between the flaps 42 of the vanes 36 and securing the flaps together so as to capture the face sheet therebetween. While the vanes in the fabric will normally be of equal width and the folds 54 in the face sheet equally spaced, it is possible to use vanes of varying widths to obtain different aesthetics and in such cases the spacing between folds would preferably correlate with the width of the adjacent vanes. A bead of adhesive to be described in more detail later can be placed on either or both flaps before the fold 54 of face sheet is positioned therebetween. After the fold is desirably positioned between the flaps, the flaps can be compressed together and the adhesive activated, if necessary, to secure the face sheet to the flaps along a line of attachment running the length of the vane and disposed outwardly of the line of attachment 52 of the short and long walls 48 and 50, respectively, of the vane. Preferably, the face sheet material has enough permeability to allow the adhesive to flow therethrough thereby bonding not only the face sheet to each flap, but also the flaps to each other.

In an alternative arrangement shown in FIG. 2C, the fold 54 in the face sheet 38 can be wrapped around both flaps 42 so as to encapsulate the flaps therein. In this arrangement beads of adhesive 55 would be placed on an external surface of the flaps so as to directly engage the fold in the face sheet. Preferably the flaps would have enough permeability to allow the adhesive to flow therethrough and bond the flaps together as the flaps are being bonded to the fold in the face sheet.

It is preferable that the face sheet 38 be a knit fabric even though some woven fabrics will work. It is also preferable for desired functional and aesthetic cooperation with the vanes 36, that the face sheet 38 be transparent or translucent for the passage of some light and vision. It is also preferred that the face sheet have diagonal, dimensional stability. Knit fabrics are preferable to wovens as they can be cut with a cold knife type cutter thus not requiring the more expensive hot knives or laser cutters. For reasons that will become clearer later with the description of the apparatus for fabricating the fabric 32 of the present invention, it is preferable that the face sheet have a low elongation rate, i.e., it not be very stretchy in the machine or cross direction. The vanes are desirably attached to the face sheet so as to extend in the cross direction of the face sheet and the machine direction stiffness of the fabric must be low as it must bend at the juncture with every vane 36 inasmuch as the vanes are rotated 180° relative to the face sheet. If the machine direction stiffness is too high, there will be excessive forward and backward swings of the end vanes along the sides of a window blind as the vanes are rotated. It is also important that the fabric have good springback in its machine direction, i.e., that it not take a set, so that the vanes can swing each direction easily.

Preferably the face sheet fabric has high cross direction stiffness as this contributes positively to a better drape appearance of the product when suspended in a window opening. To obtain a higher cross direction stiffness, weft insertion fabrics can be used. Weft insertion is a knitting process wherein threads are inserted in the cross direction to add texture. Additionally, these threads generally add cross direction stiffness without adding machine direction stiffness. An example of a fabric found suitable for use as the face sheet 38 is Angelica sheer identified by Style No. 36707 by its manufacturer Guilford Mills of Greensboro, N.C.

As mentioned previously, the fabric 32 of the present invention is suspended from an operating system by carriers that are releasably connected to hanger plates 40 (FIGS. 1–5) internally connected to each vane adjacent an open upper end thereof. As an option, in order to conceal the hanger plate, and its connection to an associated carrier in the operating system, a strip of valance fabric 56 (FIGS. 2, 2A and 2B) can be bonded to the face sheet 38 along its upper edge so as to overlap the top end of the face sheet. The valance fabric would preferably have light-controlling characteristics or in other words be somewhat opaque and non-vision transmitting. The valance thereby blocks any vision of the hanger plates or associated parts of the operating system which might otherwise be visible above the face sheet 38 and vanes 36. Instead of a separate valance strip, the height of the face sheet can be made in excess of the vane length so as to form a valance extension portion of the face sheet (not illustrated). While the face sheet is preferably translucent or transparent, it would still have a subduing effect as far as concealing the operating system.

Figure 29:
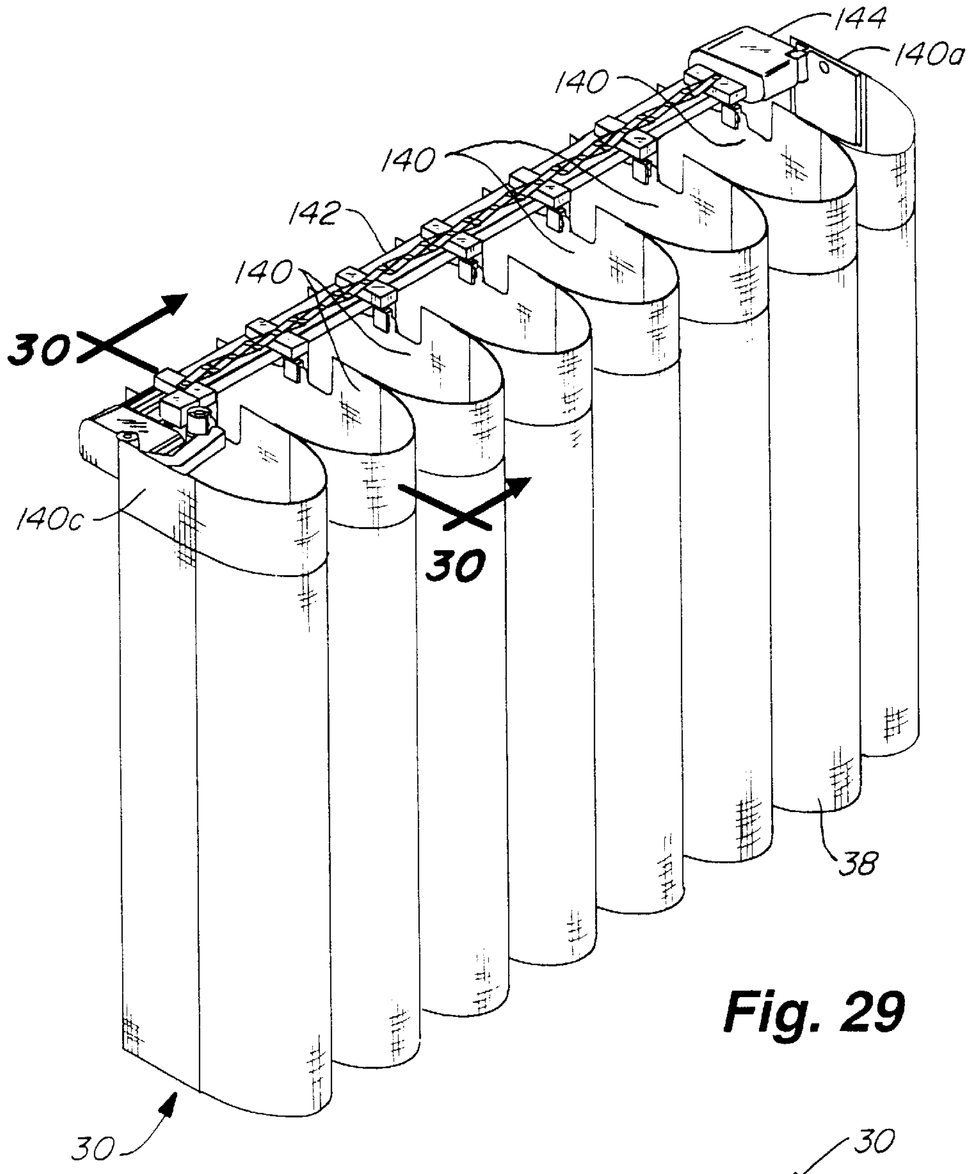
FIG. 29 is an isometric view showing a window covering in accordance with the present invention having a valance covering the operating system for the covering.
Figure 30:
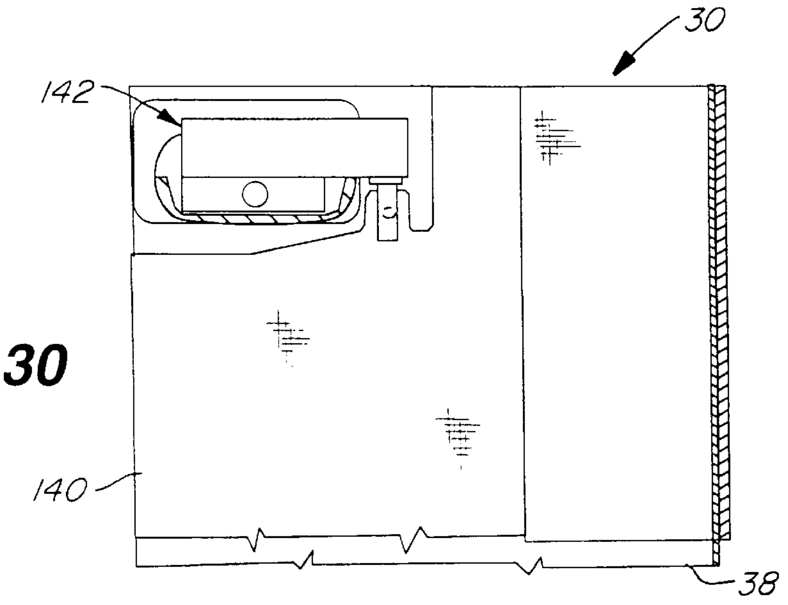
FIG. 30 is an enlarged fragmentary section taken along line 30—30 of FIG. 29.

An alternative system for covering the operating system is shown in FIGS. 29 and 30 wherein it will be appreciated that the top end of each vane has been notched to accommodate the headrail and other components of an operating system and with the vane extending along its edge that is attached to the face sheet, to an elevation above the operating system. A valance can then be optionally attached to the face sheet in overlying relationship along an upper most portion thereof with the valance preferably being opaque but at least translucent so as to block or inhibit a view of the operating system when the fabric is extended across an architectural opening as shown in FIG. 29. The notch provided in the top end of the vane allows the vanes to be desirably pivoted about a longitudinal axis through at least 180 degrees without interfering with the operating system. Of course the valance is not necessary but does add the ability to totally or substantially block the view of the operating system when the fabric is extended as shown in FIG. 29.

The valance can be attached to the fabric in many different ways but the preferred method utilizes a thermoplastic film laminated to a knit fabric with the film then being laid over the face sheet along the top edge thereof and heat laminated into place. Tape, thread or other mechanical or chemical fastening methods could also be used to hold the valance in place.

As another option, it is possible to bond an opaque blackout strip or insert 58 shown in phantom lines in FIGS. 15–19, into the interior of the tubular vane 36 if a total blockage of light through the vane is desired and in the event the vane is not fabricated from a total blockout material. A strip of such blockout material can be easily bonded internally of the tube along the line of attachment 52 by overlaying the blockout strip onto the vane strip sheet of material as the vane is being formed and as will be more fully appreciated with the description of the apparatus of the invention later. If the blockout strip 58 is a soft non-crinkling material, it will not adversely affect the functional or tactile characteristic of the vanes.

The operation of a window blind 30 including the fabric 32 of the present invention is best appreciated by reference to FIGS. 1 through 6. In FIG. 1, the fabric is shown in an extended position as it would assume when extending across a window opening and wherein the vanes 36 are in an open position thereby transmitting light and vision through the space between the vanes and the fabric. FIG. 1A is an enlarged section showing in more detail the relationship of the face sheet 38 and tubular vanes 36 when in the extended and open condition of FIG. 1.

FIG. 2 is a view similar to FIG. 1 but from the opposite side of the fabric 32 and with the optional valence strip along the top of the fabric. The window blind 30 is again in an extended and open condition.

Figure 3A:
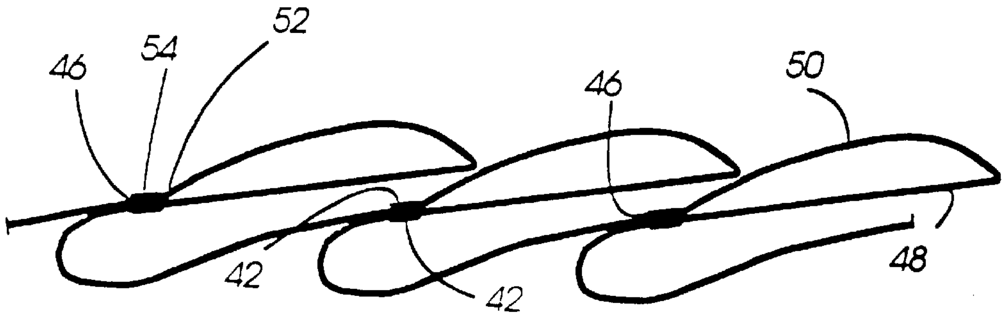
FIG. 3A is a section taken along line 3A—3A of FIG. 3.
Figure 4:
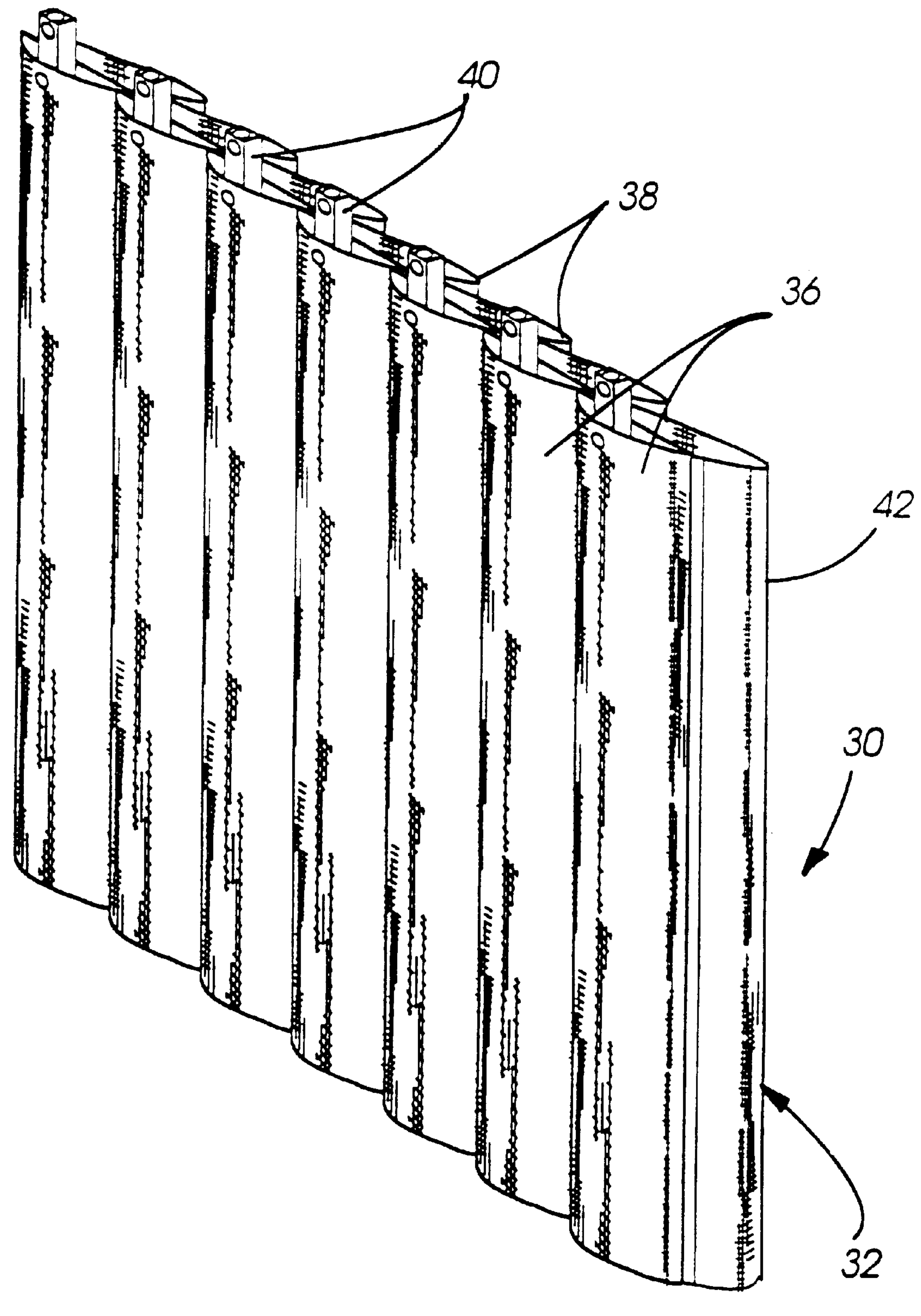
FIG. 4 is an isometric view similar to FIG. 3 with the fabric of the present invention in an extended condition and the vanes in a closed position but viewed from the opposite side.

FIG. 3 shows the window blind 30 in an extended and closed position. In other words, the fabric 32 of the window blind is extended as it would be when covering a window opening and the vanes 36 have been pivoted 90° in one direction relative to their position of FIG. 1 so as to lie coplanar and in substantially parallel relationship with the face sheet 38. Of course, in this position of the vanes wherein they are preferably overlapping, both vision and light through the fabric are blocked. FIG. 3A is an enlarged section giving a more detailed view of the relationship of the face sheet with the vanes when in the position of FIG. 3. FIG. 4 shows the fabric from the opposite side of that shown in FIG. 3 but in the same condition.

Figure 5A:
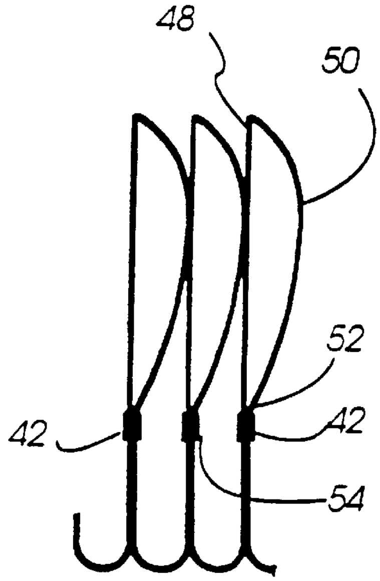
FIG. 5A is a section taken along line 5A—5A of FIG. 5.

FIG. 5 shows the fabric 32 in a retracted position as it would assume adjacent to the side of a window opening and with the vanes 36 in the open condition. The vanes assume an open condition when the fabric is retracted so that the fabric can be compactly horizontally stacked adjacent one side of a window opening. FIG. 5A is an enlarged view showing in more detail the relationship of the vanes and the face sheet in the retracted position.

Figure 6:
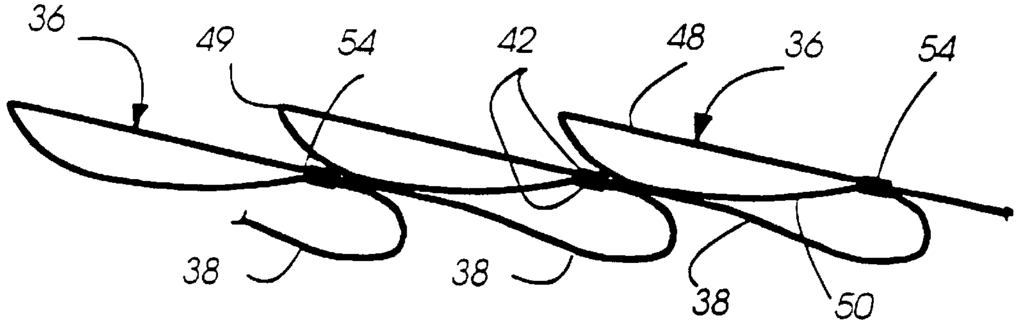
FIG. 6 is a fragmentary section taken through the fabric with the fabric extended and the vanes in a closed position but 180° opposite that shown in FIG. 3A.

FIG. 6 shows in detail the relationship of the face sheet 38 to the vanes 36 when the vanes have been pivoted 180° relative to the position shown in FIG. 3A. This of course is another closed condition of the vanes and illustrates that the vanes can in fact be rotated in either direction relative to the face sheet and assume a closed position substantially blocking vision and light through the fabric.

Figure 7:
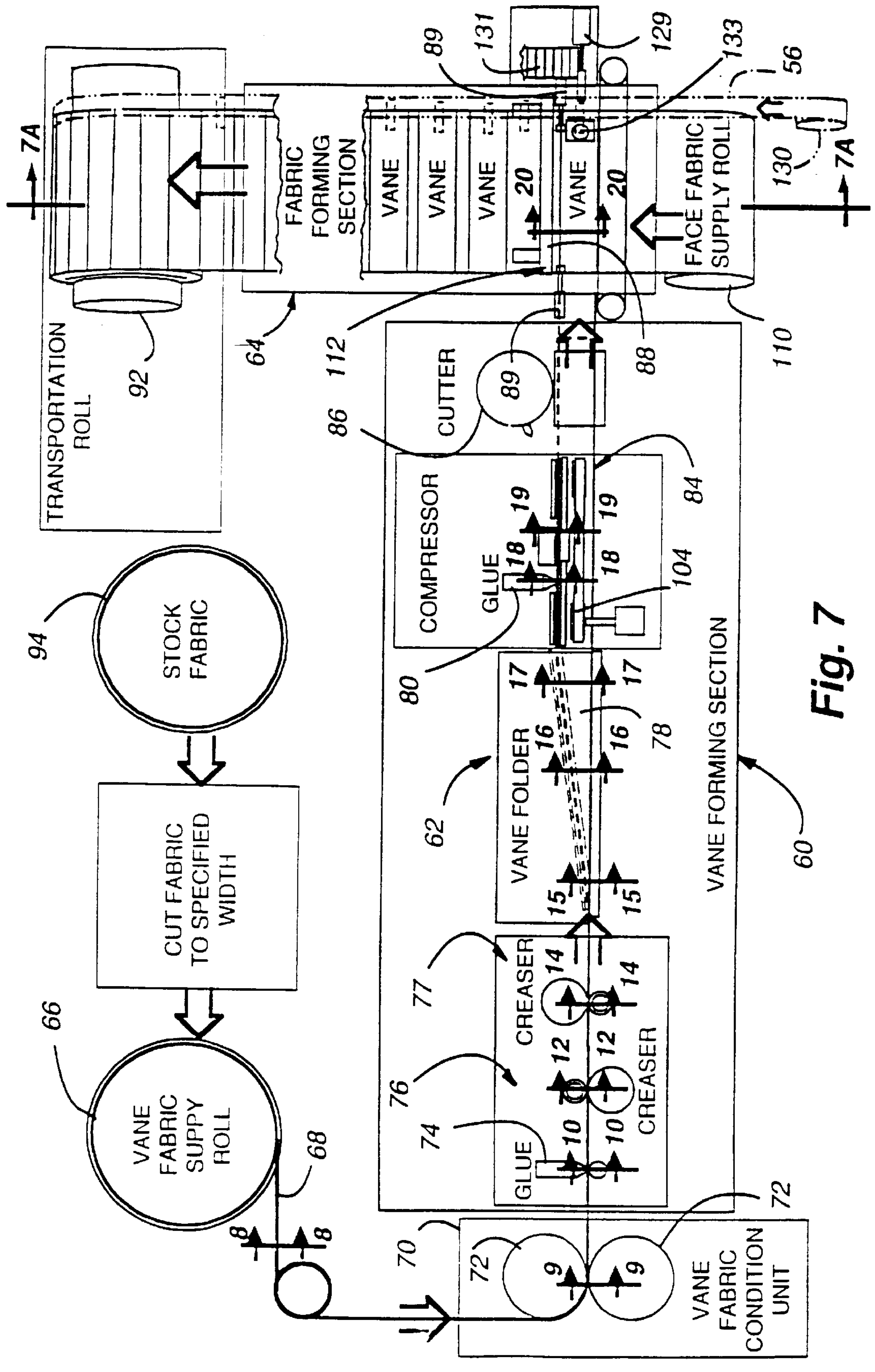
FIG. 7 is a diagrammatic representation of the apparatus of the present invention.
Figure 7A:
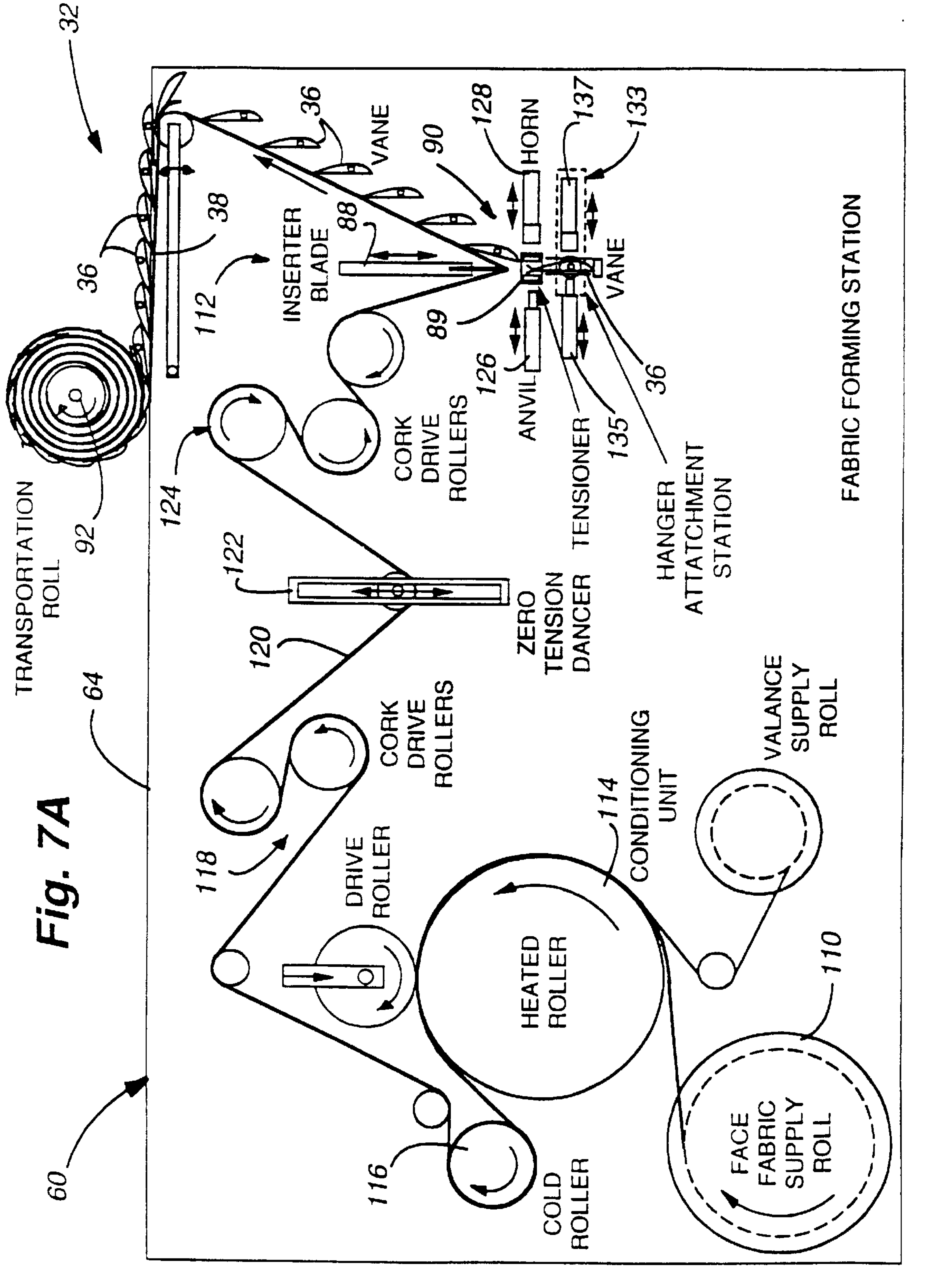
FIG. 7A is a diagrammatic representation of a portion of the apparatus taken along line 7A—7A of FIG. 7 where vanes are connected to the face sheet.

An apparatus 60 for fabricating the fabric 32 previously described is diagrammatically illustrated in FIGS. 7 and 7A. The apparatus has a vane forming section 62 and a fabric forming or combining section 64. The apparatus also includes a supply roll 66 of an elongated strip of vane fabric or sheet material 68 that has been precut, from a virgin roll 94 of stock material 94, to a specified width, e.g., approximately seven inches. The vane sheet material is advanced through a number of operating stations in the vane forming section 62 of the apparatus by driven rollers and belts that successively engage the sheet material in the various stations.

The vane sheet material 68 is initially advanced through a fabric conditioning unit 70 which is in essence a straightener that may be in the form of heated rollers 72 that remove any bow or curve in the fabric material. After the strip of sheet material 68 has been straightened, it is advanced horizontally downstream through the apparatus which includes a first glue applicator 74 for applying first lines of adhesive. Next, the strip of sheet material 68 is optionally fed through first and second creasers 76 and 77 respectively for forming creases in the strip material 68 at desired locations. Next in line is a folder 78 for folding the horizontally disposed sheet material so that the side edges 46 of the sheet material are proximate each other. A second glue applicator 80 then applies a second line of adhesive 82 at the location where the shorter and longer walls 48 and 50 respectively of the vane are to be bonded, and the strip material is then fed to a compressor 84 for pressing the shorter and longer walls of the vanes together along the second line of adhesive 82. Finally, a cutter 86 is provided for severing the strip of sheet material into predetermined lengths which define the vanes 36 of the fabric 32. The vanes are thereafter advanced into the fabric forming section 64 of the apparatus.

In the fabric forming section 64 (FIGS. 7 and 7A), an inserter blade 88 forces a section or fold of the face sheet material 38 into the space between the flaps 42 of a preformed vane 36 and after the sheet material is laterally tensioned with a tensioner 89 a second compressor 90 activates the glue lines applied by the first glue applicator 74 along the flaps to seal the face sheet material between the flaps. After sequentially connecting vanes to the sheet material in this manner, the resulting fabric 32 can be wound on an accumulation or transportation roll 92.

Figure 8:
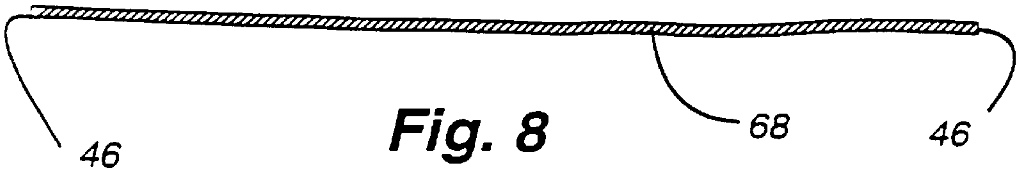
FIG. 8 is an enlarged vertical section taken along line 8—8 of FIG. 7.
Figure 9:
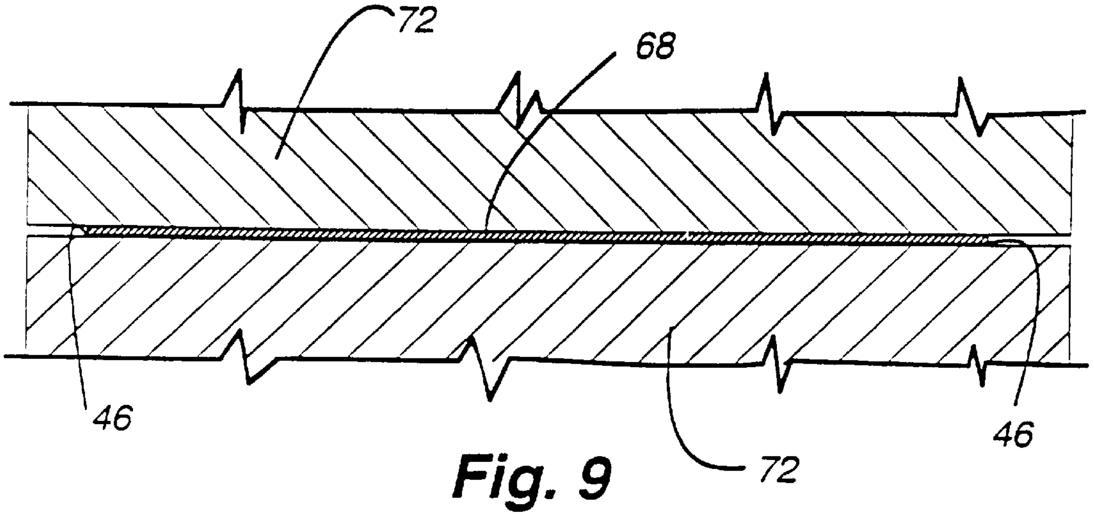
FIG. 9 is an enlarged fragmentary section taken along line 9—9 of FIG. 7.
Figure 10:
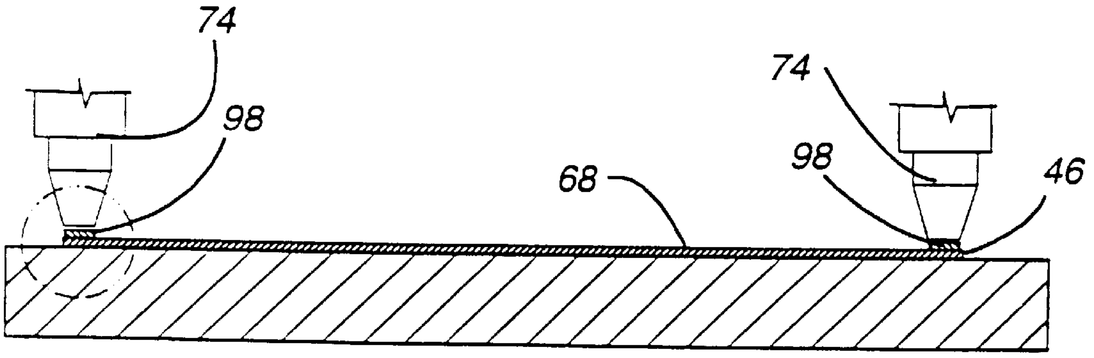
FIG. 10 is an enlarged fragmentary section taken along line 10—10 of FIG. 7.

With reference more specifically to FIG. 7 and the supporting sectional views in FIGS. 8 through 20, it will be seen that a virgin roll 94 of stock fabric or vane sheet material which might come in varying widths is first cut to a specified width in a known and conventional manner. The resulting cut fabric is accumulated on the vane sheet supply roll 66 for further processing. FIG. 8 shows the strip or web of sheet material 68 as it comes off the vane sheet supply roll and as will be appreciated, it is not totally flat but typically has small undulations or wrinkles therein. It has been found that if the vane 36 is formed from the virgin material before it is straightened, curves or twists will undesirably result in the completed vane. FIG. 9 shows the virgin material being fed between the heated rollers 72 which remove any such wrinkles or undulations in the material so that the material is suitable for forming a vane.

Figure 11:
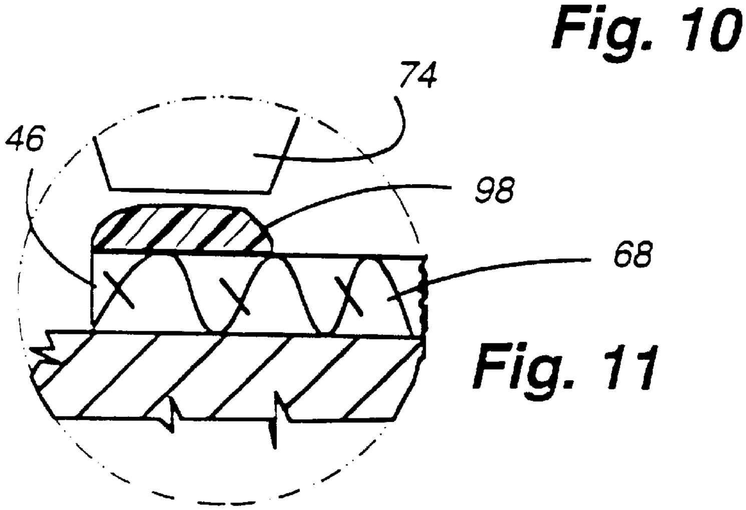
FIG. 11 is a further enlarged section illustrating an adhesive applicator shown in FIG. 10.

The strip or web of sheet material 68 (FIG. 7) emanating from the heated rollers 72 is fed downstream through the vane forming section 62 of the apparatus where it sequentially encounters the aforedescribed operating stations. The strip first encounters the adhesive or glue applicator 74 as illustrated in more detail in FIG. 10. The applicator 74 applies the first elongated continuous bead of adhesive 98 along the top face of each side edge 46 of the strip. FIG. 11 is a further enlarged view showing the beads of adhesive 98 after application to the top face of the strip of vane material. While the adhesive is applied hot and in liquid form, it quickly solidifies and needs to be re-activated before it will adhere to any other surface. A suitable adhesive for this purpose is Bostik 7983 manufactured by Bostik of Middleton, Mass.

Figure 12:
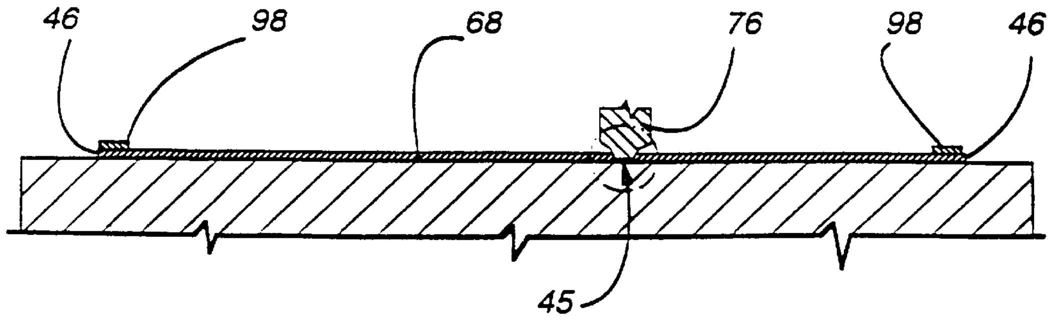
FIG. 12 is an enlarged fragmentary vertical section taken along line 12—12 of FIG. 7.
Figure 13:
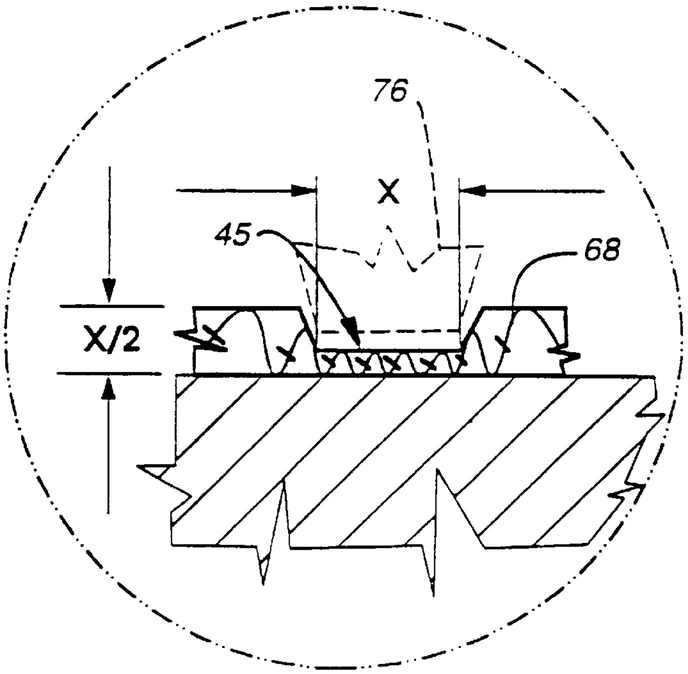
FIG. 13 is a further enlarged fragmentary section illustrating a creaser forming a crease in the sheet material as illustrated in FIG. 12.
Figure 14:
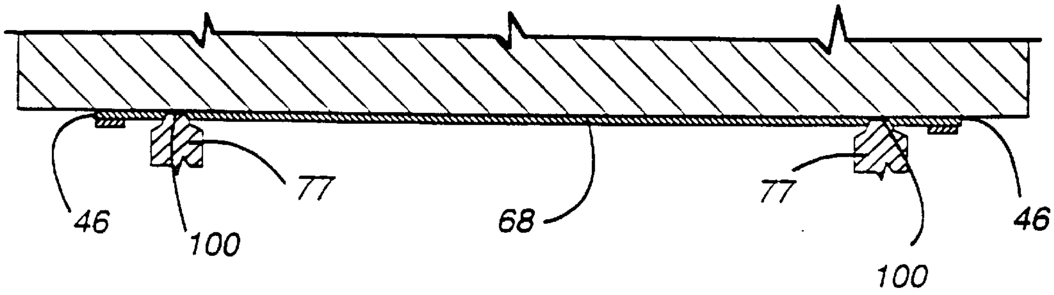
FIG. 14 is an enlarged fragmentary vertical section taken along line 14—14 of FIG. 7.

If the vane is to have a crease 45 along a longitudinal center region, which may or may not be desirable depending upon the features desired for the vane, the first creaser 76 as best seen in FIGS. 12 and 13 receives the strip of material as it emanates from the first adhesive applicator 74 and forms the crease 45 in the top face of the strip substantially along the longitudinal center line of the vane. It will be appreciated from FIG. 12 that the crease 45 is actually formed slightly off-center of the strip so that the vane formed from the strip will assume the configuration shown in FIGS. 1 through 6 with a short wall and a long wall 48 and 50 respectively. As mentioned previously, however, the crease 45 does not need to be placed in the vane, as the vane can be formed without such in accordance with the disclosure in the aforenoted U.S. Pat. No. 5,797,442. Also see description of FIGS. 25A–25E hereafter. As described in detail in the aforenoted Copending Application, the crease is desirably formed with a blunt instrument. The crease 45 would preferably be approximately twice as wide as the thickness of the sheet material. This is illustrated in FIG. 13 wherein the width of the crease is designated X and the thickness of the sheet material X/2.

After the strip leaves the first creaser, it encounters the second creaser 77 that forms creases 100 (FIG. 14) in the bottom face of the sheet material 68 along imaginary parallel lines that are spaced slightly inwardly from the side edges 46 of the strip. The creases 100 may again be formed with a blunt instrument so as to have approximately twice the width as the thickness of the sheet material but it is not critical along creases 100. A sharper crease may therefore be formed. The sheet material between the parallel creases 100 and the side edges 46 of the material define the flaps 42 for the vane and it will be appreciated that the creases in the bottom face permit easy flexing of the flaps in a downward direction whereby the crease 45 in the upper face of the sheet facilitates easy folding of the sheet upwardly to define the shorter and longer sides of the completed vane.

Figure 15:
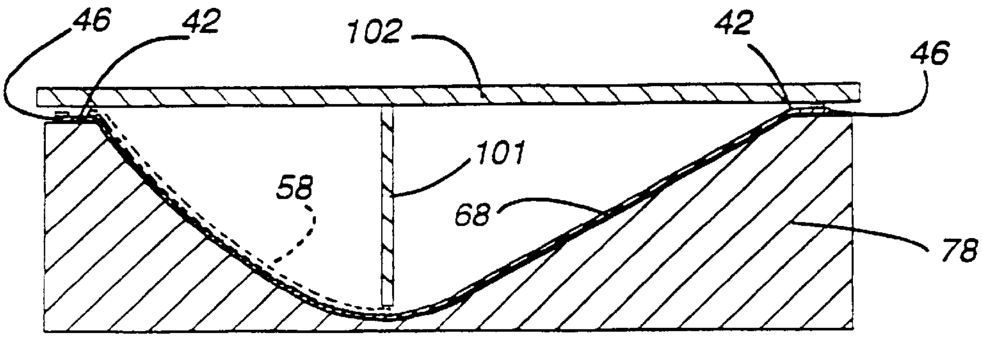
FIG. 15 is an enlarged fragmentary vertical section taken along line 15—15 of FIG. 7.
Figure 16:
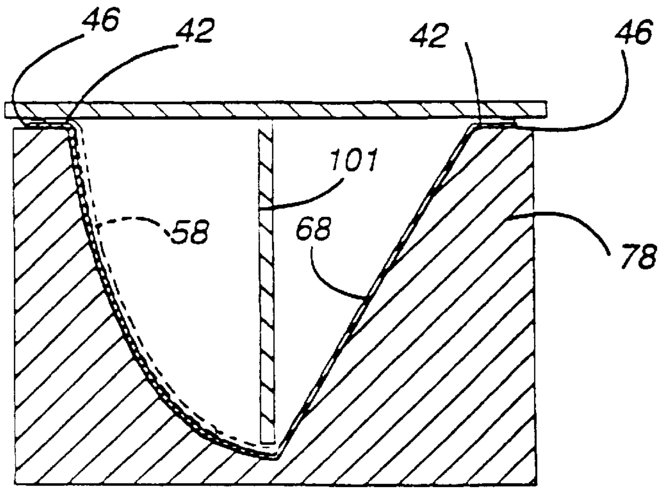
FIG. 16 is an enlarged fragmentary vertical section taken along 16—16 of FIG. 7.
Figure 18:
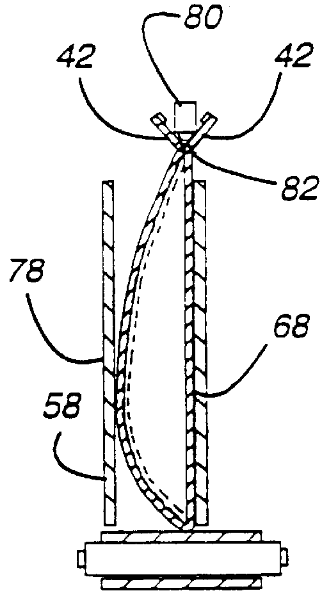
FIG. 18 is an enlarged vertical section taken along line 18—18 of FIG. 7.
Figure 17:
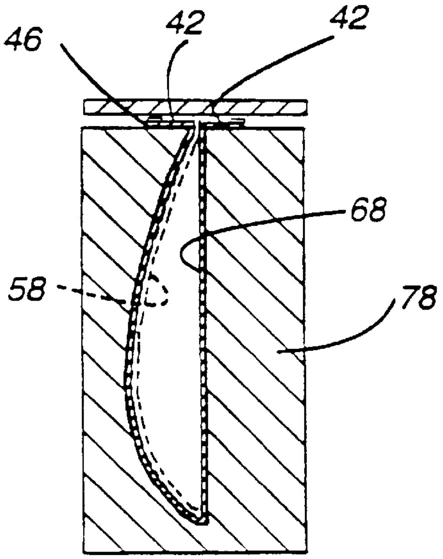
FIG. 17 is an enlarged fragmentary section taken along line 17—17 of FIG. 7.
Figure 19:
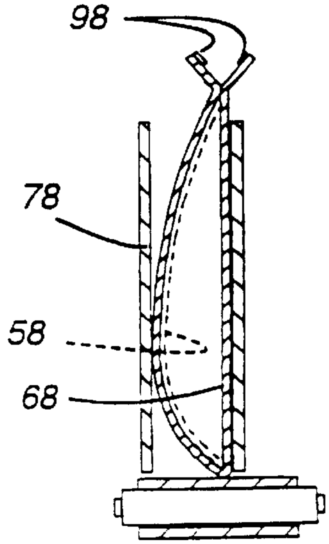
FIG. 19 is an enlarged fragmentary vertical section taken along line 19—19 of FIG. 7.

After having been appropriately creased, the sheet or web 68 is, as indicated above, fed into the folder 78 at a vane folding or forming station. The folder continuously lifts each side of the sheet or web on opposite sides of the upper crease 45. The folder can be a contoured form or trough through which the sheet material passes as it is advanced downstream through the apparatus with the contours in the form urging the sides of the sheet upwardly. The continuous folding is illustrated in FIGS. 15, 16 and 17 at the locations identified by the section lines in FIG. 7. As will be appreciated, the side edges 46 of the sheet material are ultimately positioned proximate to each other as shown in FIG. 17. As the sheet material is being folded in the folding station, a light weight bar 102 overlies the edges of the vane so as to lightly engage the flaps 42. The bar 102 thereby splays the flaps relative to the associated sides of the sheet material as the material advances through the folding station. The adhesive 98 on the flaps is not affected by the bar as it was previously solidified and needs to be reactivated before again becoming tacky. The bar 102 has a vertical leg 101 that holds the sheet 68 in the trough of the folder. It should be appreciated that the fabric material inherently wants to remain flat or in other words is somewhat biased toward a flat orientation. Accordingly, it closely follows the contours of the trough during the folding or forming step.

The sheet material 68 leaving the folding station is in the configuration illustrated in FIG. 17 and immediately encounters the second adhesive applicator 80 that applies the second continuous bead of adhesive 82 to one or both of the flaps 42 along the crease 100 between the flaps and the remainder of the sheet material. Immediately after application of the bead of adhesive 82 and before the adhesive solidifies, the sheet material is passed through the compressor or presser unit 84, which may be a pair of confronting belts 104 (FIG. 7), that forces the sides of the sheet material together along the creases 100 thereby forming the line of attachment 52 between the short and long sides of the vane so formed.

As mentioned previously, to totally obstruct the passage of light through a vane, the optional blockout strip 58 can be overlaid onto the sheet material 68 along one side thereof as it is being formed into a vane (shown in phantom lines in FIGS. 15–19). The blockout strip is secured in place with the same bead of adhesive 82 that secures the sides of the sheet material together.

Figure 26:
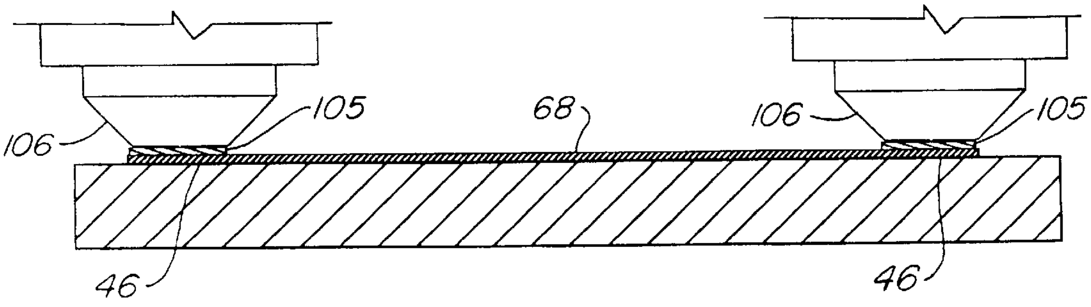
FIG. 26 is a view similar to FIG. 10 showing an alternate system for applying adhesive to the vane material.
Figure 27:
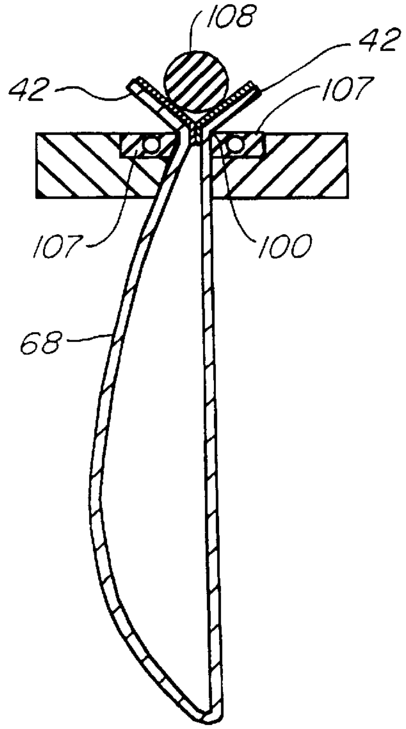
FIG. 27 is a view similar to FIG. 17 illustrating the forming of flaps on a vane consistent with the application system shown in FIG. 26.

In an alternative system for securing the vane material together thereby providing the flaps 42 for receiving the face sheet material 38, relatively broad lines of adhesive 105 can be applied along the side edges 46 of the vane material while it is lying flat before entering the folding station. Glue applicators 106 are shown in FIG. 26 in lieu of the glue applicators shown in FIG. 10 which apply relatively thin beads of adhesive. The vane material 68 is then formed into the desired configuration in the same manner with the folder 78 described previously except that instead of applying a second bead of adhesive, as with the adhesive applicator 80 previously described, the flaps are formed within the relatively broad lines of adhesive 105 which extend slightly beyond the creases 100. The sides of the vane material are brought together along the creases and the adhesive, which has previously solidified, is activated with ultrasonic or heating elements 107 immediately prior to the vane material passing through the compressor 87. In this manner, the vanes are properly formed with flaps and the flaps include adhesive on confronting faces thereof for use in subsequently securing the face sheet material 38 as will be described hereafter.

Figure 28:
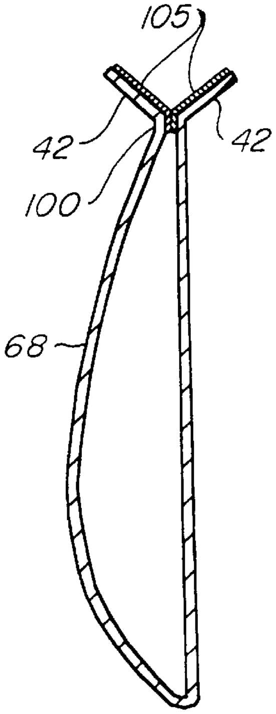
FIG. 28 is a view similar to FIG. 19 showing a completed vane formed in accordance with the alternative system shown in FIGS. 26 and 27.

In order to hold the flaps apart while the vane material is being connected along the creases 100, a cylindrical rod 108 with a tapered end is mounted in the forming station in alignment with and between the flaps to keep them separated as the vane material advances through the compressor. The adhesive does not accumulate on the cylindrical separating rod as it has previously solidified and needs to be reactivated before becoming tacky. A vane completed in accordance with this alternative system is shown in FIG. 28. It has been found when using the aforedescribed alternative system that the creases 45 and 100 can be omitted from the process and the vane will still be desirably formed.

The strip of sheet material 68 leaving the compressor 84 is advanced into a vane separation station where the cutter 86, preferably in the form of a guillotine type cutter, severs the strip of sheet material into predetermined lengths corresponding with or slightly shorter than the height of the face sheet 38 to be used in a given window opening. The cut lengths of strip material define the vanes 36 used in the fabric 32.

The vanes 36 are then advanced into the fabric forming or combining section 64 of the apparatus, shown in FIGS. 7 and 7A. In this section, the vanes 36 are first positioned in transverse alignment with a roll 110 of face sheet material 38. The roll 110 of face sheet material 38 is stored on a roller and has been precut in width in accordance with the height of the window in which the fabric 32 is to be mounted. The face sheet material is removed from the roller by the tension applied from a succession of driven rollers that advance the face sheet material through the fabric forming or combining section of the apparatus. The face sheet material, after being straightened by passage over a heated roller 114 and a subsequent cold roller 116, is fed under very low tension around a set of two cork drive rollers 118. The fabric then passes through a gravity loop 120 and is weighted down by a zero tension dancer 122 that maintains a very low tension in the gravity loop of the fabric. The low tension prevents any necking of the face sheet. The face sheet 38 then extends around a series of three cork drive rollers 124 before passing through an approximately 300° angle around and beneath an inserter 112 in the form of an elongated blunt knife blade 88. The knife blade 88 is disposed longitudinally of a precut vane 36 positioned thereunder and in overlying alignment with the vane.

The set of three cork drive rollers 124 are intermittently driven so as to momentarily stop movement of the face sheet 38 when it is being connected to a previously cut vane 36. The set of two cork drive rollers 118 are continuously driven and the zero tension dancer 122 maintains desired tension in the face sheet between the continuously driven portion of the face sheet and the intermittently driven portion.

Figure 20:
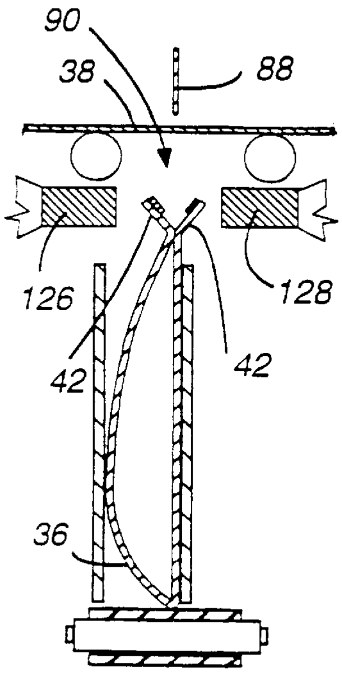
FIG. 20 is an enlarged fragmentary vertical section taken along line 20—20 of FIG. 7.
Figure 21:
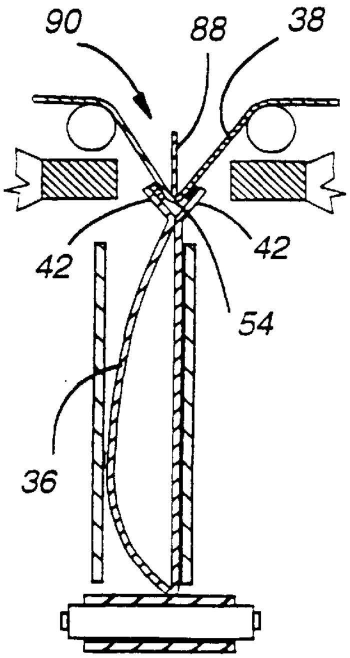
FIG. 21 is an enlarged fragmentary vertical section similar to FIG. 20 showing an insertion blade advancing the face sheet material between the flaps of a previously formed vane.

As best illustrated in FIG. 20, it will be appreciated that the flaps 42 on the vane are splayed and vertically aligned with the inserter knife blade 88 with the face sheet material positioned therebetween so that the inserter knife blade can be moved downwardly as illustrated in FIG. 21 forcing the face sheet material into the fold 54 between the flaps 42 on the vane along the entire length of the vane.

After the face sheet has been forced between the flaps on the vane, the tensioner 89 grips opposite lateral edges of the face sheet and pulls laterally on the sheet (longitudinally of the vane) to remove any wrinkles and hereby place tension in the sheet.

Figure 22:
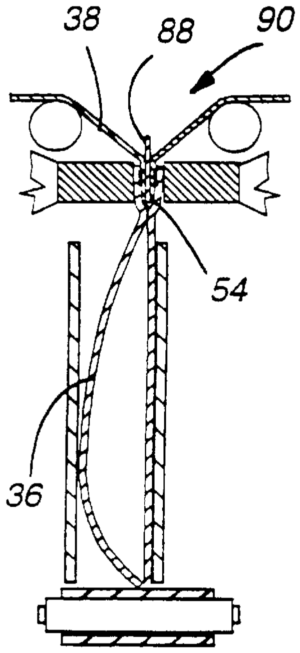
FIG. 22 is a fragmentary vertical section similar to FIG. 21 showing a face fabric material being compressed between the flaps of the vane.

The second compressor or presser unit 90, in the form of an anvil 126 and horn 128, compresses the flaps 42 into engagement with the fold 54 in the face sheet as shown in FIG. 22, while the tension is retained therein by the tensioner 89. In this condition, the horn and anvil have mechanically compressed the adhesive along the flaps against the face sheet. At this point, the adhesive 98 on the flaps is cool, so there is some degree of stick, but not a bond.

Figure 23:
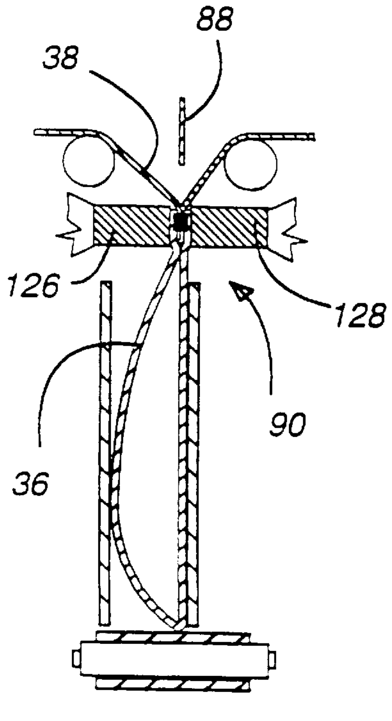
FIG. 23 is a vertical fragmentary section similar to FIG. 22 showing the insertion blade having been removed.

The inserter blade 88 is then lifted so as to remove it from between the flaps 42, as shown in FIG. 23. The face sheet 38 remains between the flaps on the vane 36 as the blade is lifted because the friction against the adhesive lines 98 is greater than the friction on the smooth steel blade. The tension in the sheet is still retained by the tensioner 89. After the steel blade has been lifted, the horn 128 is activated thereby ultrasonically remelting the adhesive 98 in between the face sheet and the flaps of the vane. Because the face sheet has permeability, the adhesive melts through and not only bonds the face sheet to the flaps of the vanes but also bonds the face sheet to itself and creates a solid bond between the flaps and the folded face sheet at this juncture. As will be appreciated, the adhesive is totally hidden from view so as to improve the aesthetics of the finished fabric product. The completed bonding of a vane 36 to the face sheet 38 is shown in FIG. 24.

As schematically illustrated in FIGS. 7 and 7A, during the time the face sheet 38 is being secured to a vane 36, the hanger plate 40 can also be ultrasonically bonded within the open upper end of the vane so that the hanger plates are in the finished fabric product when it is ready for suspension from an operating system. An electric or pneumatic injector 129 positioned adjacent to one side of the face sheet 38 places hanger plates 40 from a supply cartridge 131 of the hanger plates in the open upper end of the vane that is being attached to the face sheet. Another compressor 133 in the form of an anvil 135 and horn 137, positioned adjacent to the compressor 90 (FIG. 7A), is then activated to ultrasonically bond the hanger plate to one side wall of the vane 36.

Figure 24:
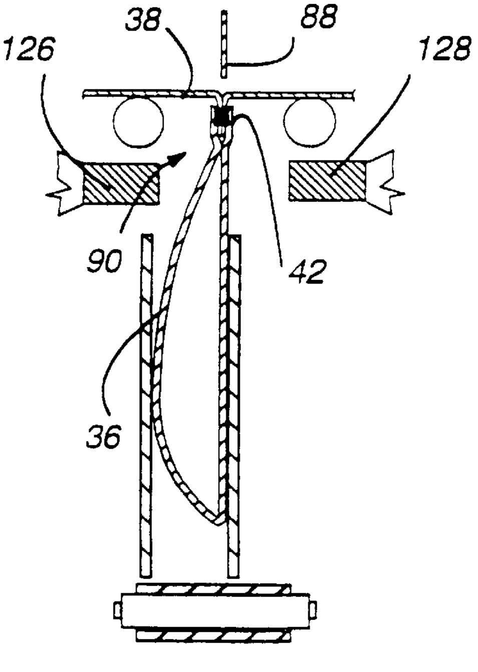
FIG. 24 is a fragmentary vertical section showing the vane interconnected to the face fabric.

After the anvil 126 and horn 128 are retracted as shown in FIG. 24, the face sheet 38 is again advanced forward via the three cork drive rollers 124. The completed fabric consisting of the face sheet 38 and the interconnected vanes 36 is then loosely wound onto the large driven accumulation or transportation roll 92 (FIGS. 7 and 7A). The apparatus in the fabric forming or combining section continuously repeats the above cycle thereby bonding each next formed or successive vane to the face sheet at a preselected spacing from the previously bonded vane.

The direction of rotation of the roll may be such that the vanes lie on the outside of the fabric sheet, as shown, to minimize the possibility of crushing the vanes or the vanes can be wrapped on the inside to provide better control during handling.

The valance fabric 56 (FIGS. 2 and 2A) can be bonded to the top edge of the face sheet material 38 before the vanes 36 have been connected to the face sheet. FIGS. 7 and 7A show a roll of valance material in phantom line positioned adjacent to the roll 110 of face sheet material. The valance is preferably bonded to the face sheet and overlaps the top edge so as to hide any exposed components of the operating system for the window blind that might otherwise be visible above the face sheet.

The method of the invention includes the steps of providing a supply roll of sheet material from which the vane is to be fabricated and initially advancing the sheet material through a straightener to remove any folds or curves, applying adhesive along opposite edges of the sheet material and creasing the undersurface of the strip along lines spaced slightly inwardly from the side edges of the strip. A third crease may be formed in the top surface of the sheet substantially along the longitudinal center line of the sheet.

A folding step raises the side edges of the strip until they are proximate each other at which time the step of applying a line of adhesive to the strip along the outer parallel crease lines but on the top face of the sheet material is performed. Following the step of applying the adhesive, the step of compressing the strip against itself is performed along this latter applied line of adhesive so as to form the strip into a tube having a pair of flaps protruding from a top edge thereof. The final step in forming the vanes for the fabric is cutting the tubular strip into preselected lengths.

The steps in forming the fabric from the preformed vanes and the face sheet material include the steps of advancing the vanes into lateral alignment with a supply roll of face sheet material and advancing the face sheet material across the top of the vane but beneath an inserter knife. The following step is advancing the inserter knife against the face sheet thereby forcing the face sheet into a fold which is inserted between the flaps and subsequently tensioning the sheet longitudinally of the vane. At the same time, the step of connecting a hanger plate in the open upper end of a vane is completed. Next, the steps of compressing the flaps together with the adhesive thereon and activating the adhesive to bond the fold of face sheet material between the flaps of the vane to secure the vane to the face sheet are performed. The steps involved in adhering a vane to the face sheet are repeated at intervals along the length of the face sheet and the face sheet is ultimately accumulated on a roll for transportation to a desired location.

In the event the vane was to be formed with two equal length convex sides 53 as described previously in connection with the vane 36', a former or folder 101 would be used as illustrated in FIGS. 25A–25D wherein like parts have been given like reference numerals with a prime suffix. The folder or former 101 would be similar to the previously described former 78 except that the cross-section would be configured differently. It would, however, be positioned in the vane forming section of the apparatus at the same location as the former 78. As will be appreciated in FIG. 25A, which is a section taken near the upstream end of the folder, the folder 101 defines a relatively wide trough wherein the side edges 46' of a web or sheet 68' being advanced therethrough are lifted slightly. In FIG. 25B, which is a cross-section downstream from FIG. 25A, the trough is slightly narrower and the side edges 46' have been raised considerably. The lowermost portion of the web, at the longitudinal center of the web, has been folded into a rounded side 103.

FIG. 25C is a cross-section near the downstream end of the folder 101 and it will be seen that the trough is shaped generally like a narrow U and is even narrower than it is at the extreme downstream end of the folder shown in FIG. 25D. Further, the lower end of the trough has a relatively narrow V-shaped section 104 that forms a very slight crease in the rounded and folded side 103. The crease is not enough to form a permanent bend in the fabric fibers but only enough to deform the fabric so that the fold is slightly narrower than it would be without the slight crease and is springy or resilient so as to retain the bias that urges the side walls 53 away from each other. The bias on the side walls assists the natural tendency of the fabric to be flat and thereby forces the tubular fabric web to expand and follow the contour of the inner wall of the folder as it widens at the downstream end of the folder as shown in FIG. 25D.

The web would be creased along lines 100' as with the vane 36 so as to define flaps 42'. A light weight bar 102' would also be used to splay the flaps and a vertical leg 105 on the bar 102' holds the web in the trough. A cross-section of the completed alternative vane 36' is shown in FIG. 25E.

As will be appreciated, when the fabric of the present invention is utilized in a window blind 30 there will be two endmost vanes with one endmost vane being attached to one end of an operating system so as to be fixed relative to the headrail 142 of the system and the other endmost vane being free to move along the headrail through its operative connection to the operating system 144. The endmost vane that is secured to the headrail in a fixed position will be referred to hereafter as the "fixed endmost vane" while the endmost vane that is movable along the headrail by the operating system will be referred to hereafter as the "free endmost vane."

Window blinds or other architectural coverings are either single draw, i.e., one fabric extends across the entire architectural opening, or they are center draw. Center draw coverings have two generally half-size fabrics covering the opening with each fabric having a fixed end fixed to opposite ends of the headrail and a free end movable toward the other end of the headrail so that when the covering is fully extended the free endmost vanes are disposed contiguous with each other at the center of the architectural opening.

In accordance with the present invention, the fixed endmost vane 140*a* (FIGS. 29, 31, or 32) in either a single draw or center draw system is preferably of half the width of the vanes 140 that exist between the endmost vanes. The free endmost vane 140*b* (FIGS. 31 or 32) in a center draw system is preferably of full width, while the free endmost vane 140*c* (FIG. 29) of a single draw system is of half width.

Figure 31:
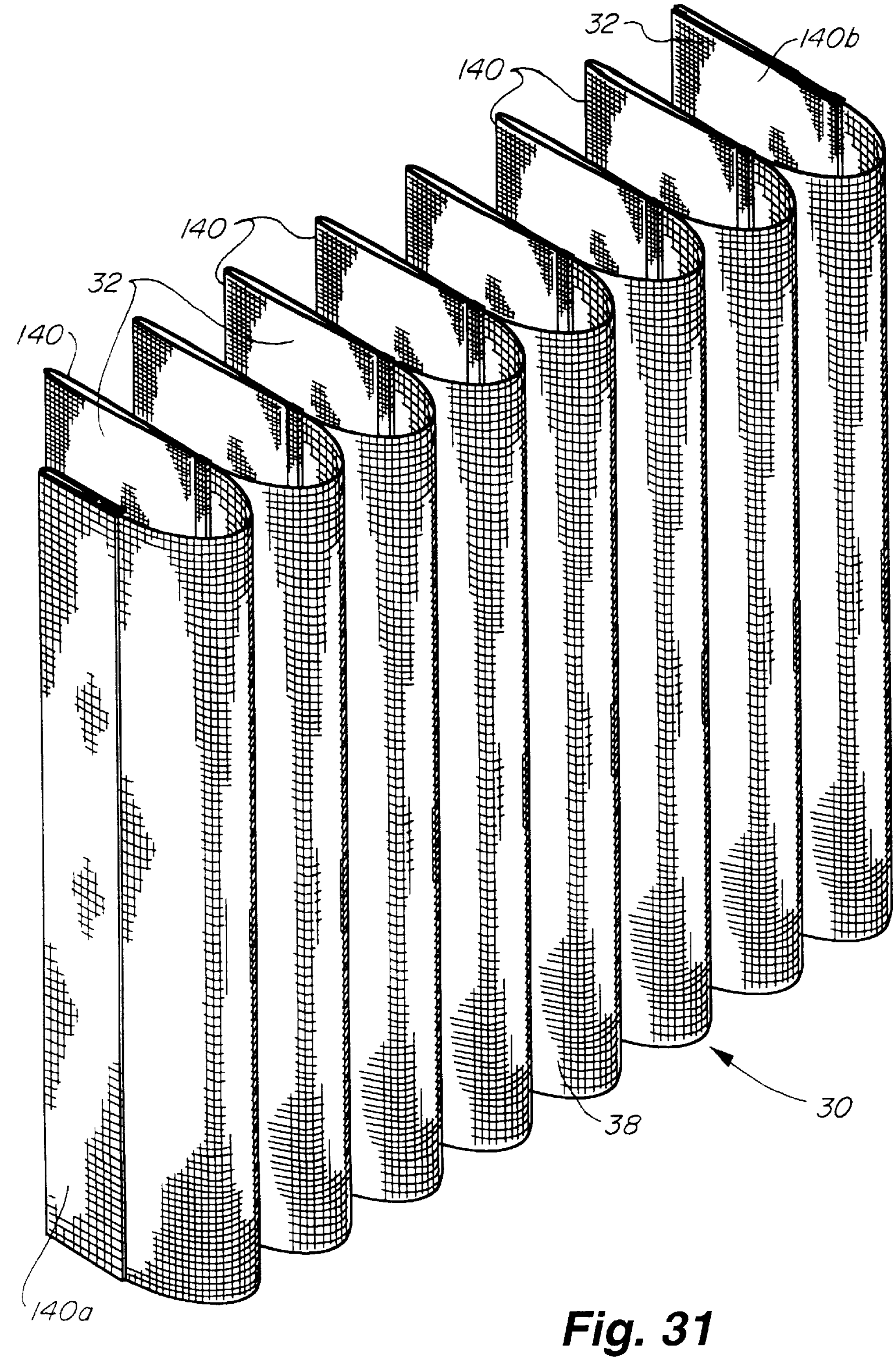
FIG. 31 is an isometric view showing the fabric of the present invention with the sides finished such that the face sheet material surrounds the associated vane.
Figure 32:
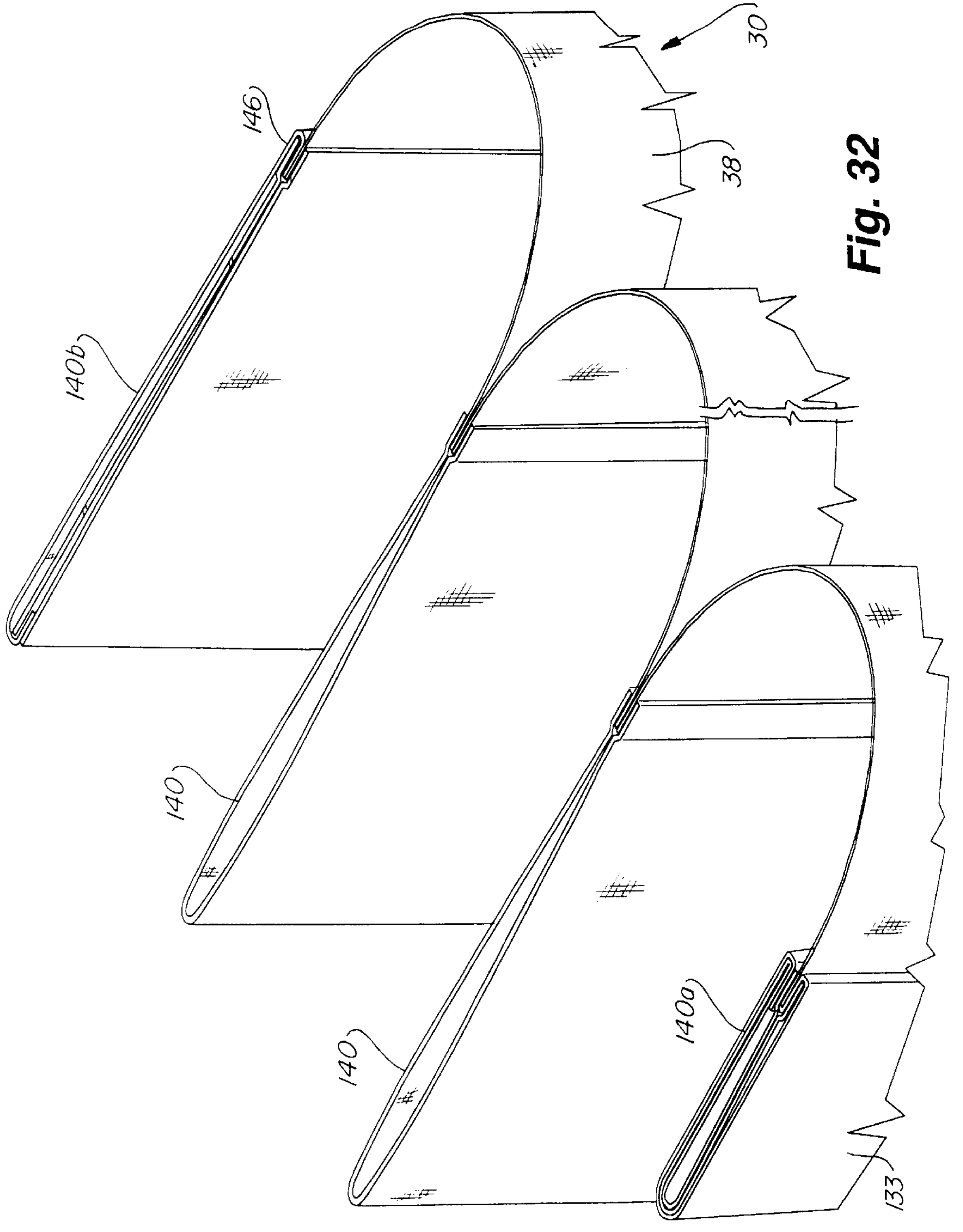
FIG. 32 is an enlarged fragmentary isometric view showing the top edge of the fabric of FIG. 31.
Figure 33:
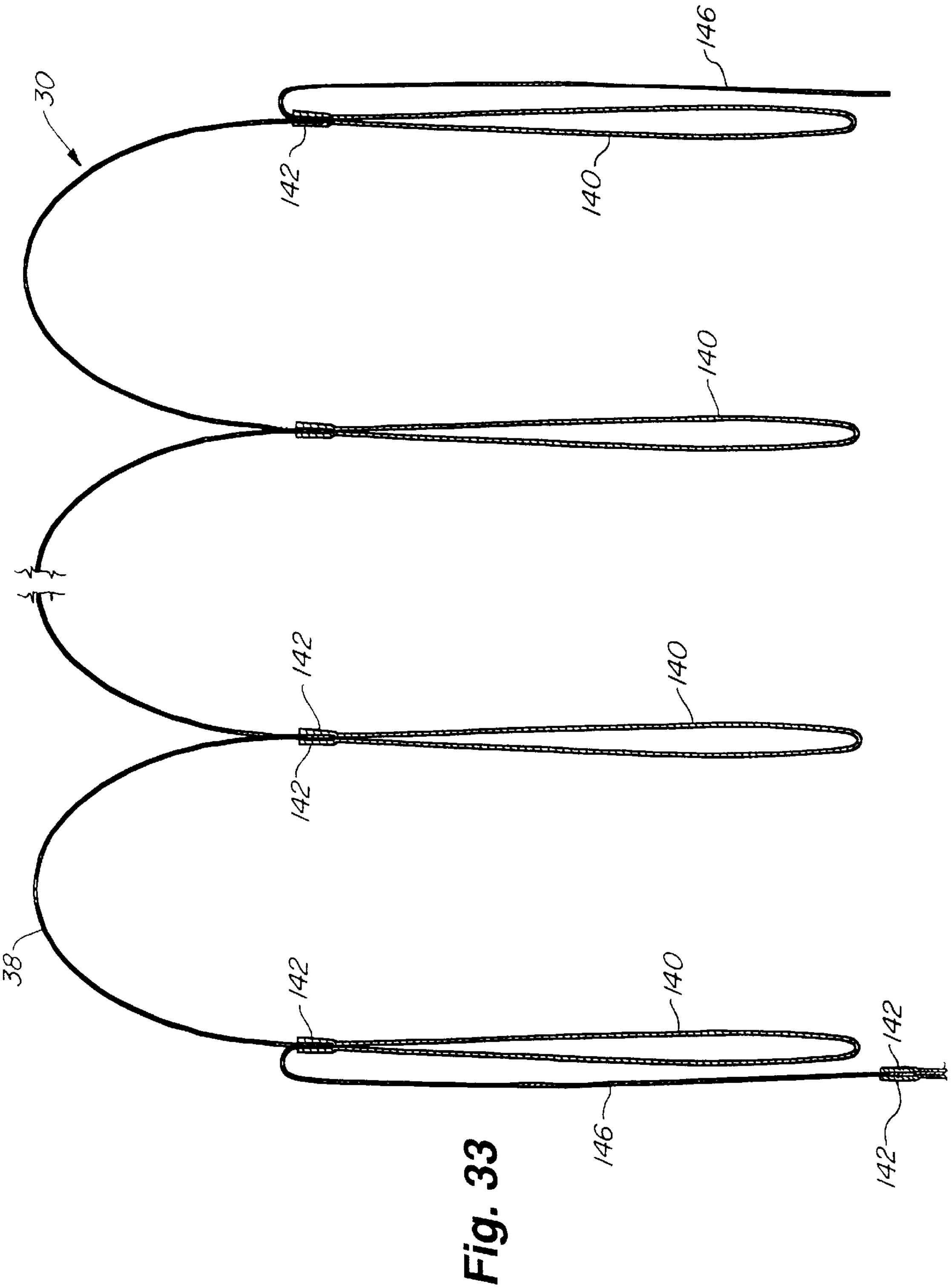
FIG. 33 is a top plan view of the fabric of FIG. 31 before the end treatments to the fabric have been performed.

When forming a full width endmost vane 140*b*, as seen in FIGS. 31 and 32, where fabric is shown for use in a center draw system, the fabric is initially provided with one more vane than is necessary. The extra vane is severed, as shown in FIG. 33, to provide a free strip 146 of face sheet material with the flaps 42 of the severed vane secured to the free edge of the free strip 146.

Figure 34A:
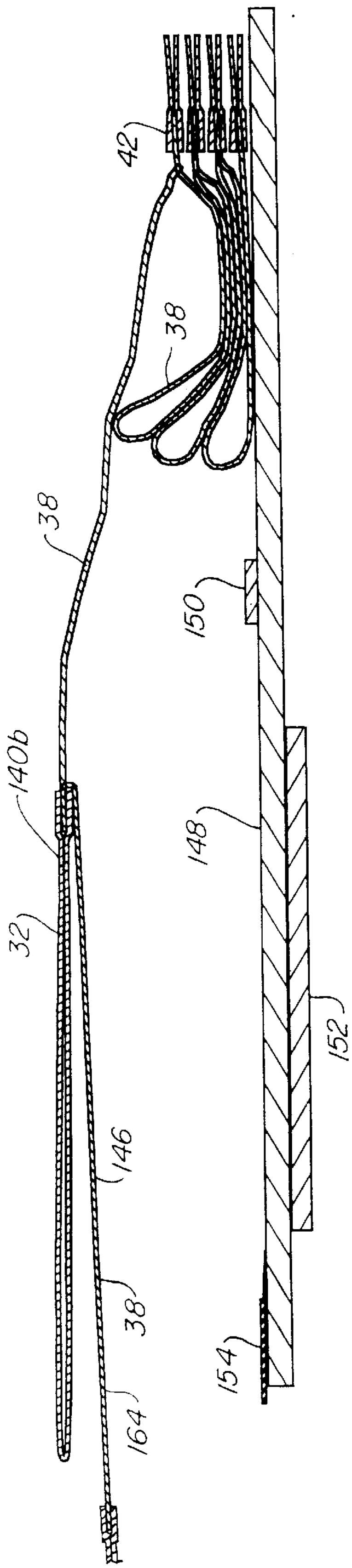
FIGS. 34A through 34K are elevational operational views showing the forming of a center vane of the fabric of FIG. 31.
Figure 34B:
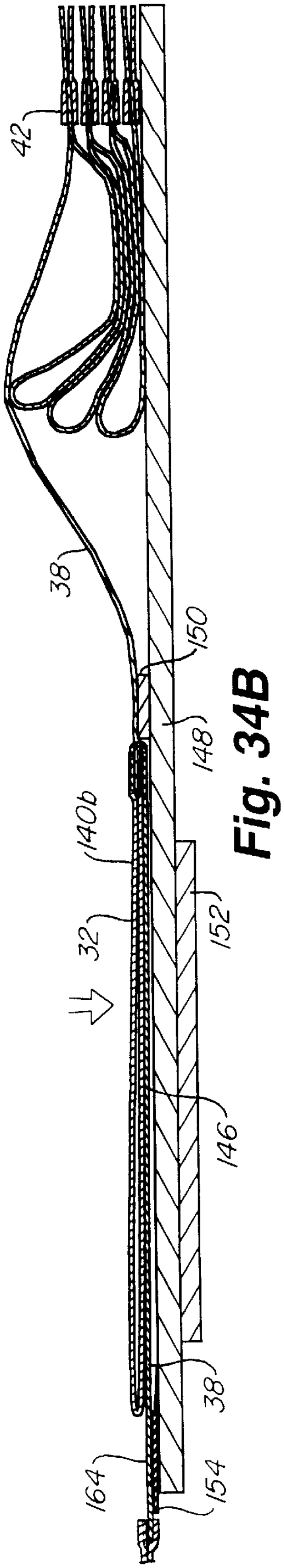
Figure 34C:
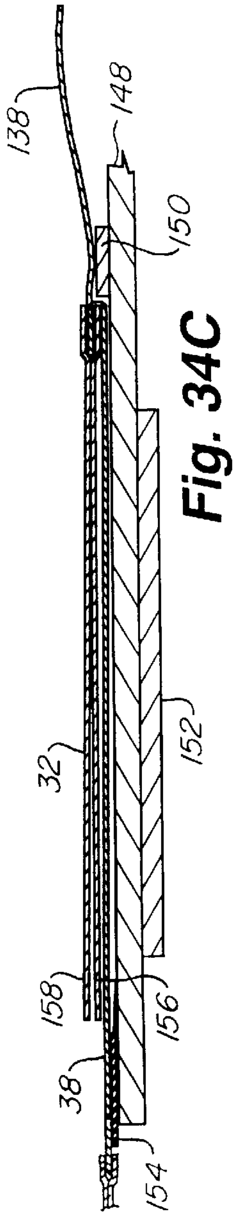

FIGS. 34A through 34I are operational views illustrating how a full width endmost vane 140*b* is treated so as to have the same textural appearance as the face sheet material 38 while forming a functional and aesthetically pleasing end of the fabric 32. With reference first to FIG. 34A, the fabric material 32 is stacked adjacent one side of a work table 148 having a longitudinally extending guide plate 150 extending along the table adjacent to the face sheet 38 side of the fabric 32. An endmost vane 140*b* is separated from the top of the stacked fabric material and positioned on the work table as shown in FIG. 34B such that the free strip 146 of face sheet material underlies the associated endmost vane. An elongated ceramic magnet 152 is removably positionable beneath the work plate in longitudinal alignment with the endmost vane.

Figure 34D:
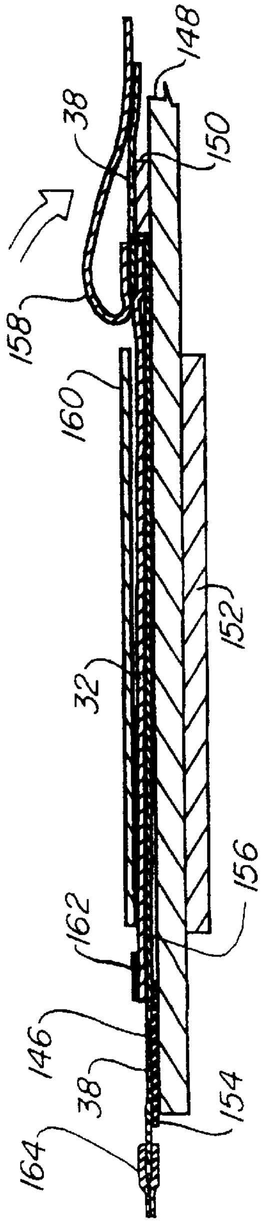

On the top face of a working side of the work table 148, opposite the side where the fabric is accumulated, a non-ferrous elongated folding strip 154 is pivotally connected to the work surface, as with a piece of tape or other flexible material, so as to extend parallel with the vane. With the endmost vane 140*b* and free strip 146 of face sheet material positioned as shown in FIG. 34B, the closed or folded edge of the vane is severed with a razor or other sharp instrument so as to define an adjacent vane side 156 and an overlying removed vane side 158. The removed vane side 158, as shown in FIG. 34D, is then folded rearwardly toward the accumulated stack of fabric material and an elongated ferrous metal strip 160 is laid on top of the adjacent vane side 156. As an alternative, the ferrous metal strip could be inserted into the hollow vane before its folded edge is severed. The ceramic magnet is next positioned beneath the table to attract the ferrous metal strip 160 thereby releasably and substantially immovably trapping the adjacent vaneside 156 and strip 146 of face sheet material next to the work table to prevent them from moving during subsequent operations. A strip 162 of double-faced adhesive or other suitable adhesive is then bonded to the free edge of the adjacent vane side 156 also as illustrated in FIG. 34D.

Figure 34E:
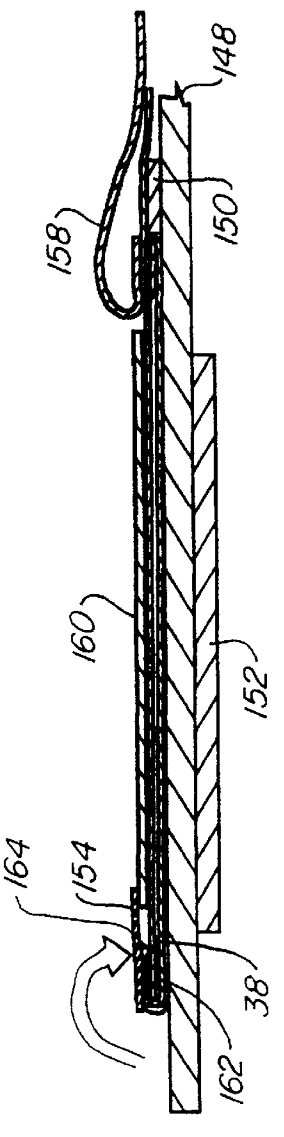
Figure 34F:
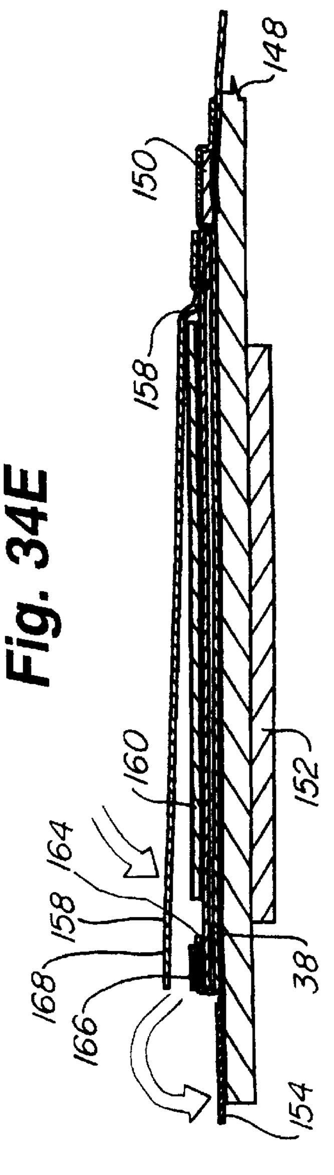

Subsequently, the folding strip 154 is pivoted in a clockwise direction as shown in FIG. 34E thereby lifting the free edge 164 of the free strip of face sheet material 38, with the flaps 42 from the severed vane, into overlying and bonding relationship with the adhesive strip 162. It will thus be appreciated that the face sheet material then forms a fold around the free edge of the adjacent vane side 156. Thereafter, the folding strip 154 is pivoted counterclockwise to its original position and a subsequent strip 166 of double-faced adhesive is applied over the folded free edge 164 of the face sheet material before the folded removed vane side 158 is returned to its overlying relationship with the remainder of the vane so that the free edge 168 of the removed vane side can engage and be adhesively bonded to the double-faced adhesive strip 166. The flap 42 from the severed vane are captured between the sides of the now endmost vane to reinforce and add rigidity to the edge of the vane (see FIG. 34I).

Figure 34G:
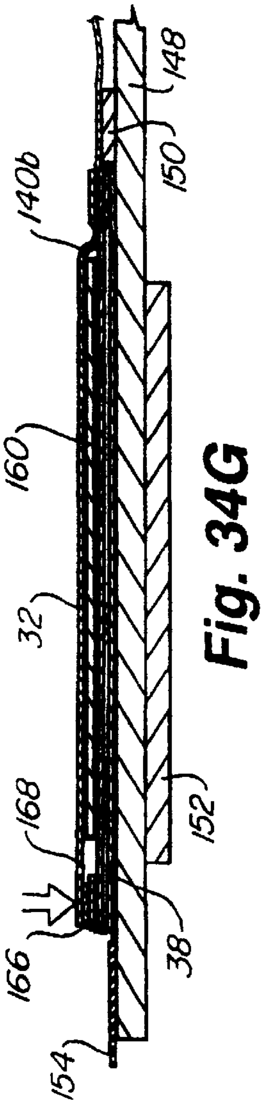

FIG. 34G shows the endmost vane 140*b* after the free edge 164 of the face sheet material has been secured thereto and the vane reconstituted by reconnecting the severed edges of the adjacent and removed vane sides. Thereafter, the ceramic magnet 152 is removed so that the ferrous metal strip 160 can be easily removed from the center of the vane.

Figure 34H:
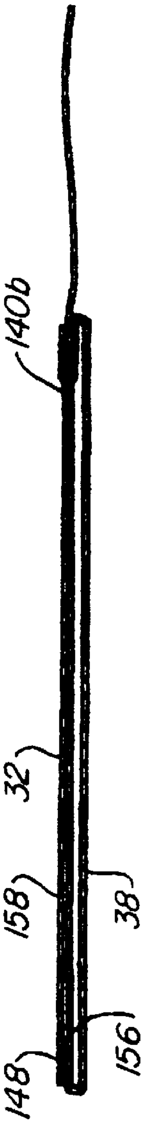

The vane is then configured as shown in FIG. 34H with the outer face of the vane having a covering of the face sheet material so that it has the same textural appearance as the face sheet material. The covered endmost vane 140*b* is also consistent in composition with the remainder of the fabric so as to hold up well when exposed to substantial solar heat as is experienced by window coverings.

It is desirable that the face sheet material 38 at its connection with the endmost vane be somewhat loose so as to provide a fairly broad or soft fold. The soft fold establishes a means by which the free endmost vanes in a center draw system can engage each other when the covering is extended across an architectural opening thereby forming a light seal with each other so as to block the passage of light therebetween.

To establish a soft fold 171, a spacer strip 170 (FIG. 34J) can be positioned between the adjacent vane side 156 and the strip 146 of face sheet material before the face sheet material is folded around and secured to the adjacent vane side. When the spacer strip is subsequently removed, a softer fold is established in the vane (FIG. 34K) permitting a better light blocking seal between endmost vanes in a center draw architectural covering when the covering is extended.

Figure 34I:
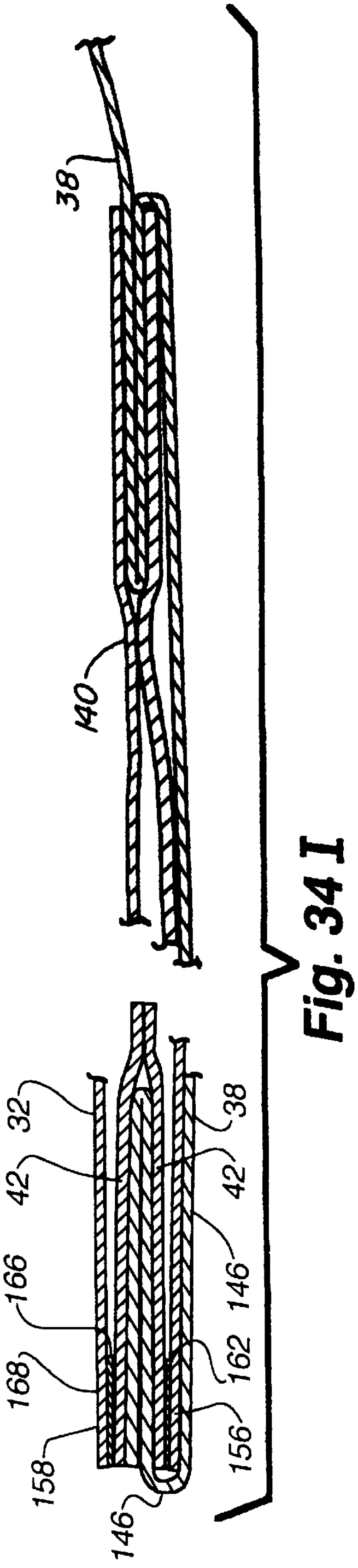
Figure 34J:
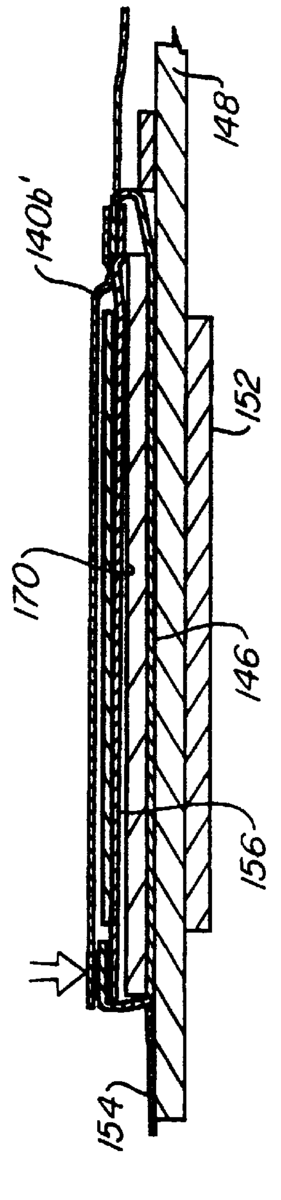
Figure 34K:
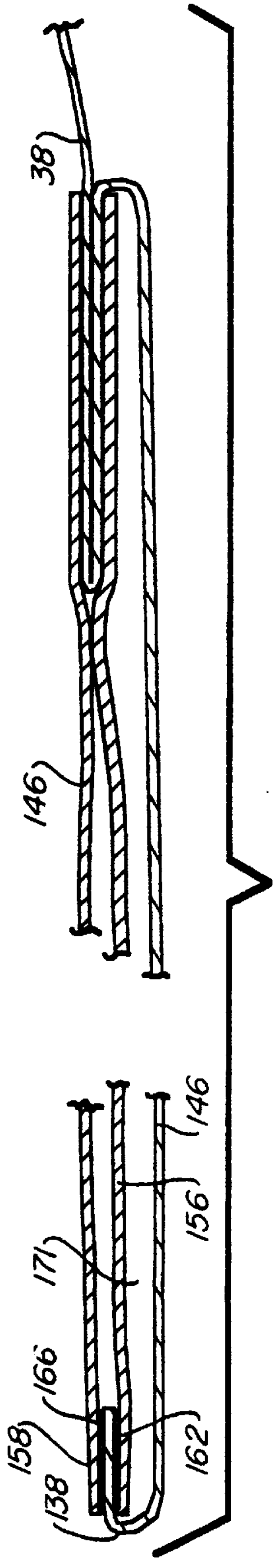

It will be appreciated from the aforedescribed method that an endmost vane 140*b* of full width as illustrated in FIGS. 34I or 34K can be provided which will give the desired aesthetic appearance and functional characteristics to the free endmost vane used in a center draw system.

The free endmost vane 140*c* (FIG. 29) of a single draw system is desirably half the width of a full vane. This is particularly desirable when the fabric is used with an operating system of the type disclosed in commonly owned copending U.S. application Ser. No. 08/639,905 (Apr. 24, 1996), now U.S. Pat. No. 5,819,833 (Oct. 13, 1998), entitled "Control and Suspension System for a Vertical Vane Covering for Architectural Openings," the disclosure of which is hereby incorporated by reference. In a system of the type disclosed in that application, the free endmost vane 140*c* is mounted on a pivot arm so that when the vane reaches the non-control end of the headrail, it is wrapped around the end of the headrail. On the contrary, however, when the covering is not fully extended, the hanger for the free endmost vane forces the longitudinal center line of the vane away from the headrail a greater distance than the remaining vanes in the covering and for that reason a vane of approximately half width is desirable to retain a uniform displacement of the outer edges of the vanes from the headrail.

Figure 35A:
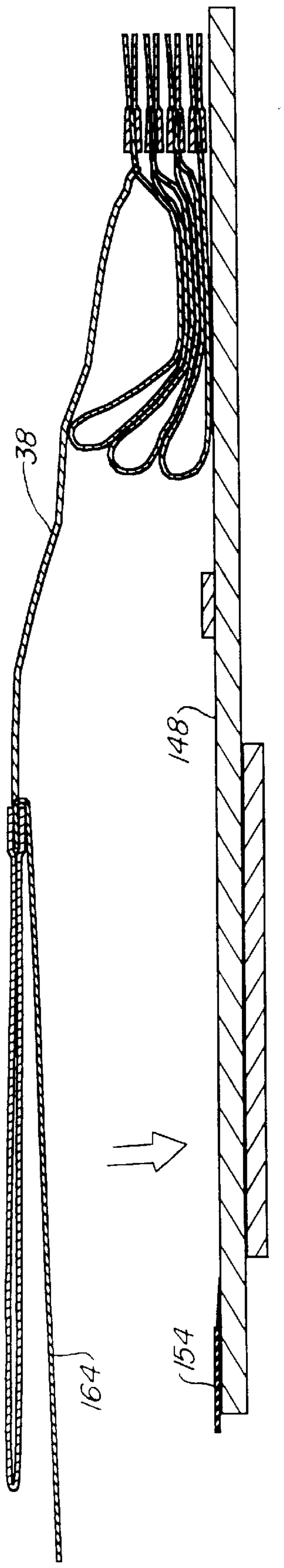
FIGS. 35A through 35G are elevational operational views showing the fixed end vane of the fabric of FIG. 31.
Figure 35B:
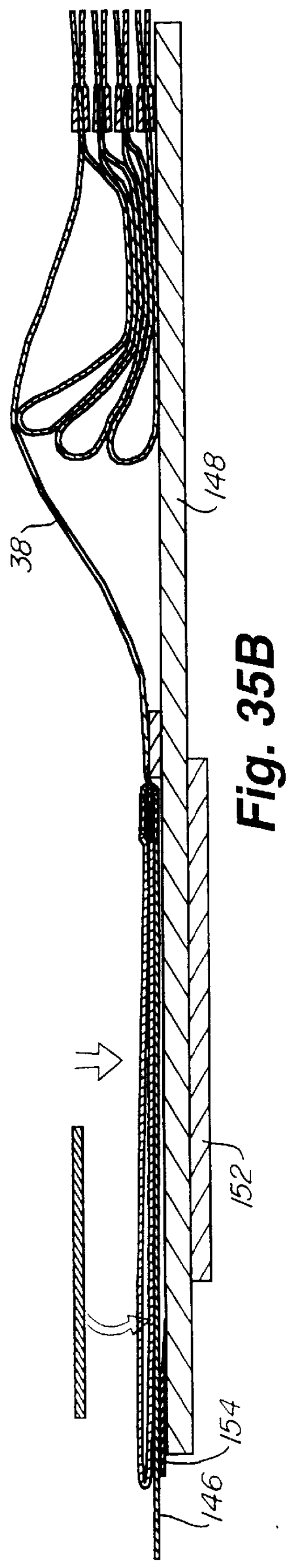
Figure 35C:
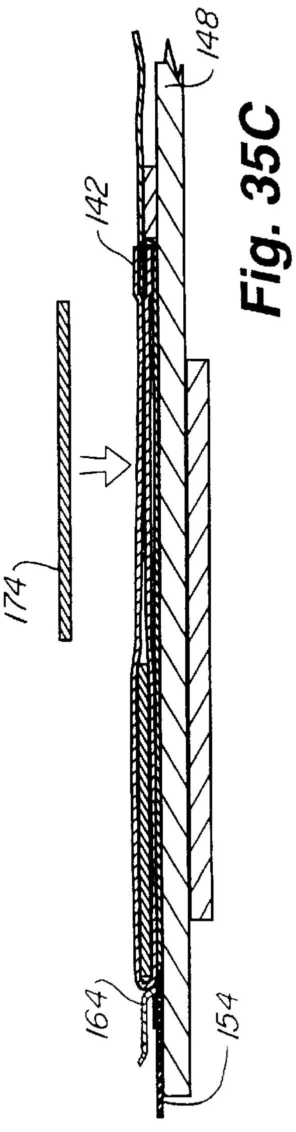
Figure 35D:
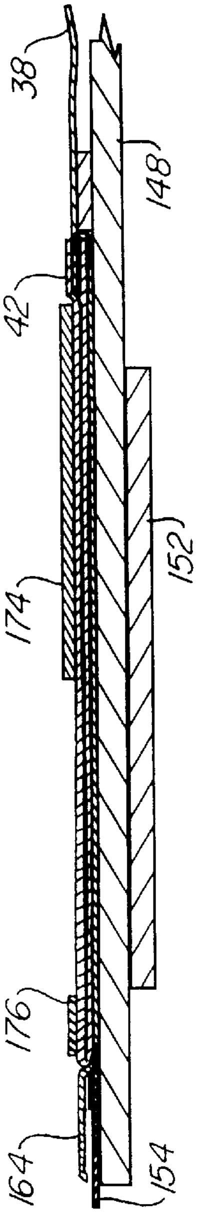

FIGS. 35A through 35G are operational views showing a method for forming a free endmost vane 140*c* or 140*a* of approximately half the width of a full vane 140 and with reference to FIG. 35A, a work table 148 as described previously is again provided. A free strip 146 of face sheet material 38, slightly wider than the width of a full vane, is provided and again the vane, with the free strip of face sheet material therebeneath, is laid upon the work table with the free edge 164 of the face sheet material overlying a folding strip 154 as shown in FIG. 35B. The folding strip is identical to that previously described and shown in FIGS. 34A–34G. A strip 174 of ferrous metal is next positioned on the top of the vane adjacent the flaps 42 of the vane. A ceramic magnet 152, as provided in accordance with the teachings in FIGS. 34A–34G, is thereafter moved adjacent to the underside of the work table as shown in FIG. 35D so that the ferrous strip 174 is positively drawn toward the work table to hold the vane and the free strip of face sheet material in place on the work table. Next a strip 176 of double faced longitudinally extending adhesive is applied to the top of the vane adjacent the folded edge of the vane.

Figure 35E:
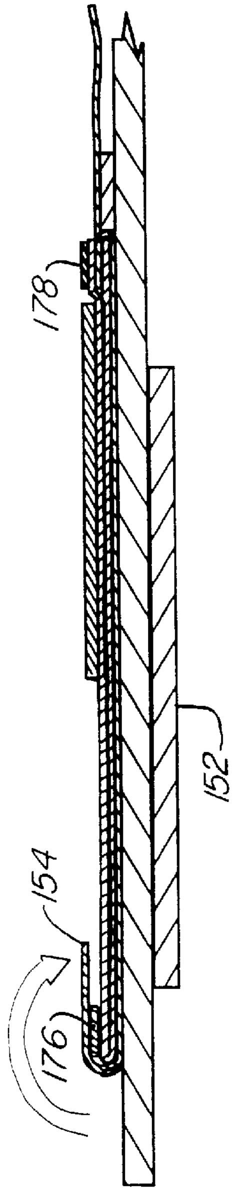
Figure 35F:
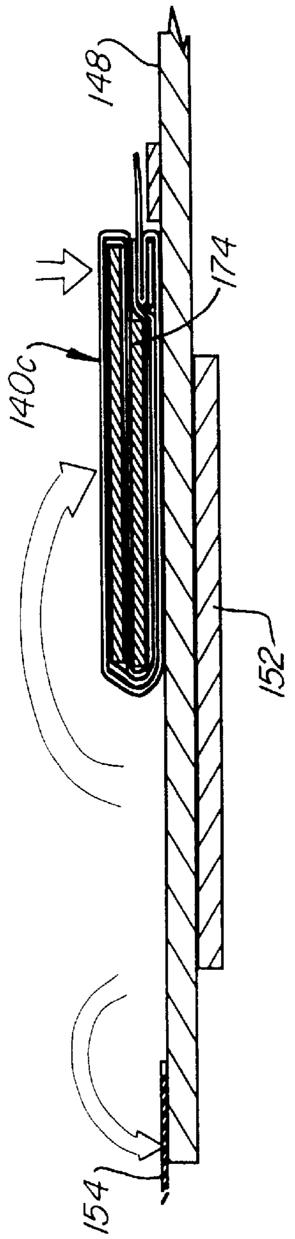

Thereafter, the folding strip 154 is pivoted clockwise lifting the free edge 164 of the face sheet material into overlying bonding relationship with the adhesive strip 176 as shown in FIG. 35E. The folding strip 154 is then returned to its original position. Next a strip 178 of double faced adhesive is placed on the top of the flaps 42 of the vane adjacent to the ferrous strip 174 and the vane is folded upon itself about the ferrous strip so that the folded edge of the vane is engaged and bonded to the adhesive strip 178 as shown in FIG. 35F.

Figure 35G:
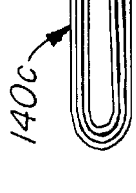

Finally, the magnet 152 is removed from beneath the work table and the ferrous strip is removed from the vane leaving the vane as illustrated in FIG. 35G of approximately half width but with an outer covering of face sheet material so that the vane has the same textural appearance as the face sheet material. The fixed endmost vane 140*a* in a single draw system is preferably the same half width as the free endmost vane 140*c* so that when the fabric is fully extended across a window opening, the ends of the fabric will have the same appearance.

In utilizing the fabric 32 of the present invention as a window blind, the face sheet material 38 faces the interior of the room and for that reason it is important that the end-most vanes have the same textural appearance as the face sheet material for aesthetic purposes. As will be appreciated from the above description, an end treatment for the fabric of the present invention is provided which is not only durable but strengthens the edges of the fabric so that it hangs desirably without drooping and in a manner that provides a uniform appearance and presentation of the face sheet material throughout the entire fabric.

Although the present invention has been described with reference to the presently preferred embodiments, it is understood that the present disclosure has been made by way of example, and changes in detail or structure may be made without departing from the spirit of the invention, as defined in the appended claims.

What is claimed is:

1. An apparatus for fabricating a hollow tubular vane for an architectural covering device wherein said covering device includes a plurality of elongated vanes operatively interconnected by a vane control system comprising in combination;

a supply roll of sheet material having longitudinal side edges, a system for advancing said sheet material along said apparatus, an adhesive applicator adapted to apply a bead of adhesive along at least one of said side edges of said sheet material, said bead of adhesive covering an imaginary line spaced inwardly a short distance from said at least one side edge, a folder adapted to progressively fold the longitudinal side edges of said sheet material until the side edges are adjacent to each other, and the sheet material is in a hollow tubular configuration, a compressor adapted to compress said longitudinal side edges together along the bead of adhesive and said imaginary line so as to define a flap along each longitudinal side edge, at least one of said flaps having said bead of adhesive thereon, and a cutter for cutting the folded tubular first sheet of material into preselected lengths defining said vanes.

2. The apparatus of claim 1 wherein said adhesive applicator is adapted to apply a bead of adhesive along both of said side edges.

3. An apparatus for fabricating a hollow tubular vane for an architectural covering device wherein said covering device includes a plurality of elongated vanes operatively interconnected by a vane control system comprising in combination;

a supply roll of sheet material having longitudinal side edges, a system for advancing said sheet material along said apparatus, an adhesive applicator adapted to apply a bead of adhesive along at least one of said side edges of said sheet material, said bead of adhesive covering an imaginary line spaced inwardly a short distance from said at least one side edge, a folder adapted to progressively fold the longitudinal side edges of said sheet material until the side edges are adjacent to each other, and the sheet material is in a hollow tubular configuration, a compressor adapted to compress said longitudinal side edges together along the bead of adhesive and said imaginary line so as to define a flap along each longitudinal side edge, at least one of said flaps having said bead of adhesive thereon, a cutter for cutting the folded tubular first sheet of material into preselected lengths defining said vanes, and a separator for retaining the separation of said flaps as said compressor compresses the longitudinal side edges, said separator comprising an elongated rod having a tapered leading end adapted to continuously separate said flaps and retain the separation while the longitudinal side edges are compressed.

4. The apparatus of claim 3 wherein said elongated rod is of circular cross-section.

5. The apparatus of claim 3 wherein said adhesive applicator is adapted to apply a bead of adhesive along both of said side edges.

6. An apparatus for fabricating a fabric for an architectural covering device wherein said fabric includes a plurality of elongated vanes interconnected by a sheet of material along parallel lines of connection, said apparatus having a vane forming section and a fabric forming section and comprising in combination, a first supply roll of a first sheet material having longitudinal side edges, a system for advancing said first sheet material along said vane forming section of the apparatus, a first adhesive applicator adapted to apply a bead of adhesive along at least one of said side edges of said first sheet material, a folder adapted to progressively fold the longitudinal side edges of said first sheet material until the side edges are adjacent to each other, a second adhesive applicator adapted to apply a bead of adhesive along a line spaced inwardly a short distance from at least one of said longitudinal side edges, a compressor adapted to compress said longitudinal side edges together along the bead of adhesive applied by said second adhesive applicator so as to define a flap along each longitudinal side edge, at least one of said flaps having said bead of adhesive thereon applied by said first adhesive applicator, a cutter for cutting the folded first sheet of material into preselected lengths defining said vanes and advancing the vanes into the fabric forming section of the apparatus, a second supply roll of a second sheet material in said fabric forming section, a removal system for removing said second sheet material and advancing it across said vanes, an inserter positioned adjacent to said second sheet material and a vane, said inserter adapted to insert a section of said second sheet material between said flaps of the vane, a second compressor for squeezing said flaps together to pinch said second sheet material therebetween, said bead of adhesive on at least one of said flaps securing the flaps on said vanes to said second sheet material.

7. The apparatus of claim 6 further including a straightener adapted to remove any bow from the first sheet material prior to applying the beads of adhesive with said first adhesive applicator.

8. The apparatus of claim 6 further including a creaser adapted to form parallel creases in said first sheet material before said second adhesive applicator places a bead of adhesive on said first sheet material.

9. The apparatus of claim 7 further including a creaser adapted to form parallel creases in said first sheet material after it has been straightened.

10. The apparatus of claim 6 or 7 wherein said creaser is further adapted to form a longitudinal crease along a longitudinal central region of said first sheet material.

11. The apparatus of claim 10 wherein said parallel creases are formed in the opposite face of said first sheet material from said longitudinal crease.

12. The apparatus of claim 6 wherein said first sheet material is disposed horizontally when entering said folder, said folder being adapted to simultaneously lift the longitudinal edges of said first sheet material until said side edges are proximate to each other.

13. The apparatus of claim 6 further including an accumulator roll adapted to accumulate the fabric after the vanes have been secured to said second sheet material.

14. The apparatus of claim 6 wherein said second adhesive applicator applies said bead of adhesive after said first sheet material has been folded by said folder.

15. An apparatus for fabricating a fabric architectural covering wherein said covering includes a plurality of elongated vanes, each defined by a hollow body constructed solely of a first fabric material, with said vanes being interconnected in spaced relationship to each other by a separate second fabric material along spaced lines of attachment, said apparatus having a vane forming section and a combining section and comprising in combination:

a) a first system for advancing an elongated hollow body as defined by said first fabric material along said vane forming section;

b) a cutter for cutting said elongated hollow body as defined by said first fabric material transversely thereof into predetermined lengths defining successive vanes and directing said vanes along a first path and into the combining section of the apparatus;

c) a supply of a second fabric material in said combining section, said second fabric material having opposite longitudinal edges;

d) a second system for advancing said second fabric material in a direction of said opposite longitudinal edges and along a second path intersecting said first path at a combining station; and e) an attachment means positioned at said combining station for attaching said second fabric material at selected spaced locations along the direction of said longitudinal edges to the successive vanes as said vanes move along said first path and into said combining section to position said vanes at said spaced locations, with each vane extending between said longitudinal edges of said second fabric material.

16. An apparatus for fabricating a fabric architectural covering wherein said covering includes a plurality of elongated vanes interconnected by a separate piece of material along parallel lines of attachment, said apparatus having a vane forming section and a combining section and comprising in combination:

a) a first supply roll of a first fabric material having opposite edges and adjacent edge portions;

b) a first system for advancing said first fabric material along said vane forming section;

c) adhesive applicator means for applying at least one bead of adhesive adjacent to at least one of said edges of said first fabric material;

d) a folder for progressively folding said first fabric material longitudinally of said edges until said edge portions are adjacent to each other to define a first folded material;

e) a presser for pressing said first folded material together along said at least one bead of adhesive;

f) a cutter for cutting said first folded material transversely of said opposite edges into predetermined lengths defining successive vanes and directing said successive vanes along a first path and into the combining section of the apparatus;

g) a second supply roll of a second fabric material in said combining section, said second fabric material having opposite longitudinal edges;

h) a second system for advancing said second fabric material in a direction of said opposite longitudinal edges and along a second path intersecting said first path at a combining station; and i) attachment means positioned at said combining station for attaching said second fabric material at selected spaced locations along the direction of said longitudinal edges to the successive vanes as they move along said first path and into said combining section to position said vanes at said spaced locations, with each vane extending between said opposite longitudinal edges of said second fabric material.

17. An apparatus for fabricating a fabric architectural covering wherein said covering includes a plurality of elongated vanes interconnected by a separate piece of material along parallel lines of attachment, said apparatus having a vane forming section and a combining section and comprising in combination:

a) a first supply roll of a first fabric material having opposite edges and adjacent edge portions;

b) a first system for advancing said first fabric material along said vane forming section;

c) adhesive applicator means for applying at least one bead of adhesive adjacent to at least one of said edges of said first fabric material;

d) a folder for progressively folding said first fabric material longitudinally of said edges until said edge portions are adjacent to each other to define a first folded material;

e) a second adhesive applicator for applying a second bead of adhesive onto said first fabric material along a line spaced from said first bead;

f) a presser for pressing said first folded material together along one of said beads of adhesive so as to define a flap disposed between said one bead and each opposite edge, at least one of said flaps having the other of said beads of adhesive thereon;

g) a cutter for cutting said first folded material transversely of said opposite edges into predetermined lengths to define successive vanes and directing said successive vanes along a first path and into the combining section of the apparatus;

h) a second supply roll of a second fabric material in said combining section;

i) a second system for advancing said second fabric material along a second path intersecting said first path at a combining station;

j) an inserter positioned at said combining station for inserting spaced sections of said second fabric material between said flaps of the successive vanes as they move along said first path and into said combining section; and k) a second presser for pressing said flaps together to pinch said second fabric material therebetween and said other bead of adhesive into contact with said flaps and to said second fabric material to secure them together.

18. The apparatus according to claim 17 further including a straightener for removing any bow from the first fabric material prior to applying adhesive with said first adhesive applicator.

19. The apparatus according to claim 17 further including a creaser for forming parallel creases on one side of said first fabric material at the location of said second bead of adhesive and before said second adhesive applicator places said second bead of adhesive on said first fabric material.

20. The apparatus according to claim 19 wherein said second adhesive applicator is positioned to apply said second bead of adhesive to the side of said first fabric material opposite said one side and after said first fabric material has been folded by said folder.

21. The apparatus according to claim 17 wherein:

a) said first fabric material is disposed horizontally when entering said folder; and b) said folder includes lifters for simultaneously lifting said opposite edge portions of said first fabric material until said side edge portions are adjacent to each other.

22. The apparatus according to claim 17 further including an accumulator roll for accumulating the covering after the vanes have been attached to said second fabric material.

* * * * *

UNITED STATES PATENT AND TRADEMARK OFFICE

CERTIFICATE OF CORRECTION

PATENT NO. : 6,170,548 B1
DATED : January 9, 2001
INVENTOR(S) : Paul G. Swiszcz et al.

It is certified that error appears in the above-identified patent and that said Letters Patent is hereby corrected as shown below:

Title page,
FOREIGN PATENT DOCUMENTS, delete "288937" and insert -- 228937 --.

Signed and Sealed this

Third Day of September, 2002

*Attest:*

JAMES E. ROGAN

*Attesting Officer* *Director of the United States Patent and Trademark Office*